US012602253B2

(12) United States Patent
Reyes

(10) Patent No.: US 12,602,253 B2
(45) Date of Patent: Apr. 14, 2026

(54) PARALLEL PROCESSING IN CLOUD

(71) Applicant: Citrix Systems, Inc., Fort Lauderdale, FL (US)

(72) Inventor: Jose Reyes, Deerfield Beach, FL (US)

( * ) Notice: Subject to any disclaimer, the term of this patent is extended or adjusted under 35 U.S.C. 154(b) by 897 days.

(21) Appl. No.: 17/386,753

(22) Filed: Jul. 28, 2021

(65) Prior Publication Data

US 2023/0034835 A1    Feb. 2, 2023

(51) Int. Cl.
    *G06F 9/50*        (2006.01)
    *G06F 9/48*        (2006.01)

(52) U.S. Cl.
    CPC .......... *G06F 9/5038* (2013.01); *G06F 9/4881* (2013.01); *G06F 9/505* (2013.01); *G06F 9/5072* (2013.01)

(58) Field of Classification Search
    CPC ...... G06F 9/5038; G06F 9/4881; G06F 9/505; G06F 9/5072; G06F 2209/5017; G06F 2209/509; G06F 9/5027
    See application file for complete search history.

(56) References Cited

U.S. PATENT DOCUMENTS 8,997,107 B2 * 3/2015 Jain ........................ G06F 9/4881
                                                    718/104
2003/0188300 A1 * 10/2003 Patrudu ................... G06F 9/547
                                                    717/149

2007/0162523 A1 * 7/2007 Lin ...................... G06F 11/1004
2011/0154350 A1 * 6/2011 Doyle ................... G06F 9/5072
                                                    718/104
2012/0317579 A1 * 12/2012 Liu ..................... G06F 11/1438
                                                    718/104
2017/0083387 A1 * 3/2017 Prasad ................ G06F 9/45504
2018/0232255 A1 * 8/2018 Nordin ................. G06F 9/4881
2019/0026150 A1 * 1/2019 Shimamura .......... G06F 9/4881
2019/0129747 A1 * 5/2019 Kim ...................... G06F 9/5038
2020/0042349 A1 * 2/2020 Jain ......................... G06F 9/546
2021/0255902 A1 * 8/2021 Soon-Shiong ........ G06F 9/5027
2022/0391523 A1 * 12/2022 Kwong .............. G06F 21/6218

* cited by examiner

*Primary Examiner* — Chat C Do
*Assistant Examiner* — Tuan M Nguyen

(57) ABSTRACT

Methods and systems for distributing and concurrently executing various portions of a linearly programmed computing task in multiple cloud instances in cloud computing platforms are described herein. Upon receiving a request to execute the linearly programmed computing task, the requested task is added to a task queue. Various portions of the task may be determined based on the data structure of the data to be processed during the execution of the task. Then the portions may be distributed to multiple cloud instances for concurrent executions of the portions. Alternately, the task may be distributed to a cloud instance, which may determine the various portions based on the data structure of the data to be processed by the task, execute one or more portions, and then add requests for the other portions to the task queue such that the other portions can be distributed to other cloud instances for execution.

12 Claims, 14 Drawing Sheets

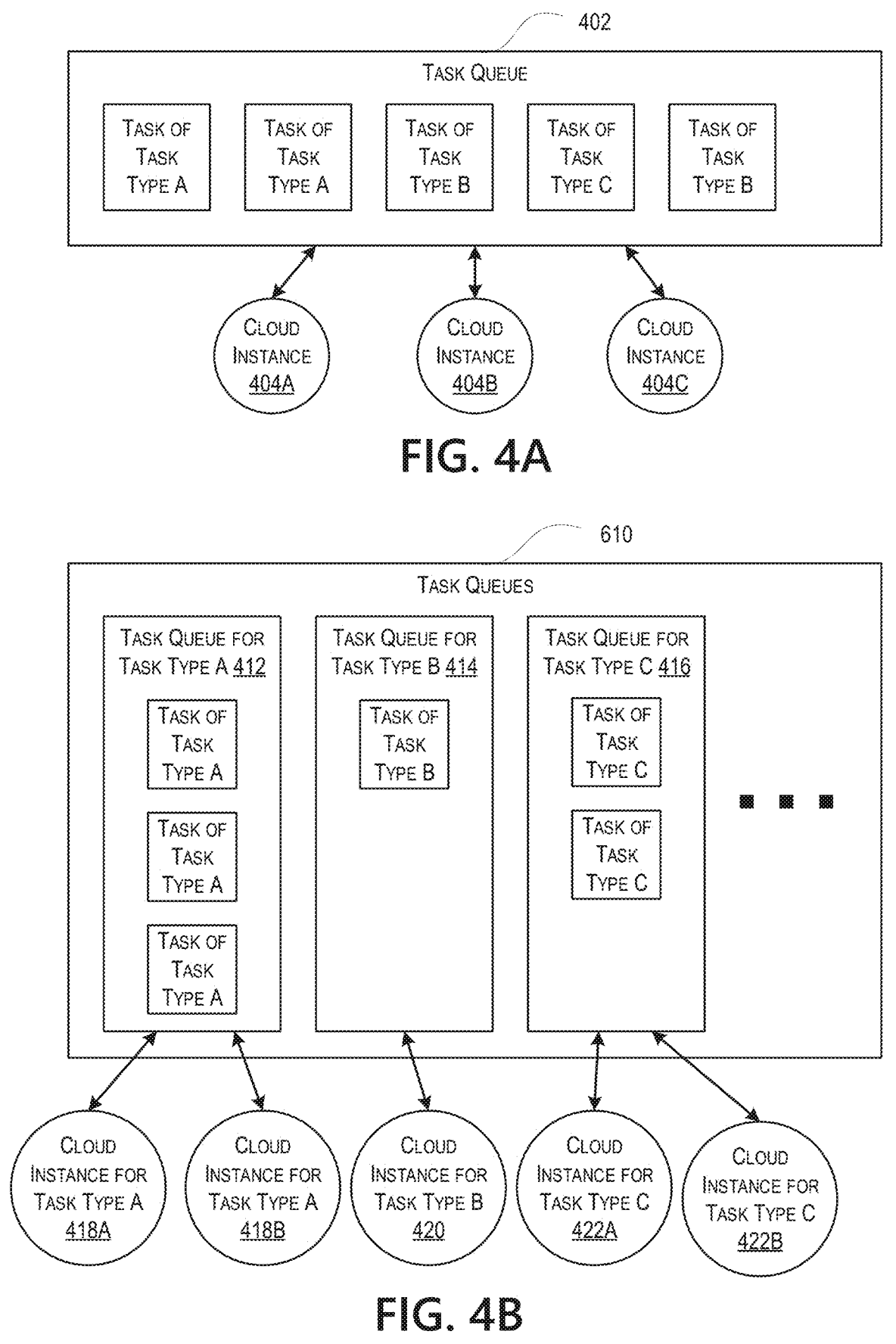

402

TASK QUEUE

| TASK OF TASK TYPE A | TASK OF TASK TYPE A | TASK OF TASK TYPE B | TASK OF TASK TYPE C | TASK OF TASK TYPE B |

CLOUD INSTANCE 404A

CLOUD INSTANCE 404B

CLOUD INSTANCE 404C

TASK QUEUES

TASK QUEUE FOR TASK TYPE A 412

TASK OF TASK TYPE A

TASK OF TASK TYPE A

TASK OF TASK TYPE A

TASK QUEUE FOR TASK TYPE B 414

TASK OF TASK TYPE B

TASK QUEUE FOR TASK TYPE C 416

TASK OF TASK TYPE C

TASK OF TASK TYPE C

∎ ∎ ∎

CLOUD INSTANCE FOR TASK TYPE A 418A

CLOUD INSTANCE FOR TASK TYPE A 418B

CLOUD INSTANCE FOR TASK TYPE B 420

CLOUD INSTANCE FOR TASK TYPE C 422A

CLOUD INSTANCE FOR TASK TYPE C 422B

FIG. 4B

PARALLEL PROCESSING IN CLOUD

FIELD

Aspects described herein generally relate to cloud computing, parallel processing, distributed computing, and hardware and software related thereto. More specifically, one or more aspects described herein relate to a distributed computing system that provides a massively parallel and distributed processing architecture in a cloud computing environment.

BACKGROUND

Cloud computing platforms provide scalable, distributed infrastructures for enabling cloud customers and/or software applications to dynamically obtain and utilize computing resources on-demand from the cloud computing platforms. Such cloud computing platforms may provide task queues where computing tasks may be submitted, and the submitted computing tasks may be distributed to cloud instances for execution from the task queues. In addition, cloud computing platforms may allow parallel processing of a task designed to be executed parallelly by more than one cloud instance.

However, most existing computer software applications are written to execute linearly or serially and are not designed for parallel execution in cloud computing platforms. For such applications to execute parallelly in cloud computing platforms, significant changes need to be implemented to applications' existing source code and architectures. For example, an application's existing source code and architecture may need to be significantly rewritten to include parallel programming techniques (e.g., multi-threading, message passing, task partitioning, etc.) and tested extensively. Such rewriting and restructuring of the existing source code and architecture is an expensive and time-consuming activity. Given these impediments, customers/organizations may not be able to adapt their existing computer software applications to execute parallelly in cloud computing platforms.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein provide a cost-effective and simple adaption process for existing computer software applications such that the applications may execute various portions of a task concurrently on multiple cloud instances on one or more cloud computing platforms.

More specifically, aspects described herein include systems and methods for parallelly executing existing software applications as computing tasks in cloud computing platforms. For example, a computing device may receive a request to execute an entire computing task, where the source code of the requested task may be written or designed to execute linearly. The requested task may be added to a task queue and then assigned or distributed to a first cloud instance for execution. An indication may be received from that first cloud instance that the first cloud instance may be performing only a first portion of the task. The first cloud instance may also request to add another task for executing the remaining portion to the task queue. Based on the first cloud instance request, the task for executing the remaining portion may be added to the task queue. The task for executing the remaining portion may then be assigned to a second cloud instance. Even though the linear programming of the code for the task may have been written such that the remaining portion is executed after the execution of the first portion, the method and system described herein may enable concurrent execution of the first portion and the remaining portion by the first and second cloud instances respectively.

In some examples, the first cloud instance may receive a first type of token when the first cloud instance receives instructions to initiate the execution of the task. The first cloud instance may determine the first portion of the task based on the first token type. A second type of token may be determined based on the performance of the first portion by the first cloud instance. When the first cloud instance requests to add the task for executing the remaining portion to the task queue, the first cloud instance request may be accompanied by the second type of token. When the task for executing the remaining portion is assigned to the second cloud instance, the second type of token may be sent to the second cloud instance such that the second cloud instance may initiate execution of the remaining portion based on the second type of token. Receiving a third type of token may indicate all portions of the initially requested task have been assigned for execution.

In some examples, the data associated with the task may be represented in a tiered data structure comprising at least a first tier and a second tier. Executing the first portion of the task may comprise processing data from the first tier by the first cloud instance, and executing the remaining portion may comprise processing data from the second tier by the second cloud instance.

In some examples, the data associated with the task may be represented in a tree data structure comprising at least a root node and one or more child nodes associated with the root node. Executing the first portion may comprise processing data from the root node by the first cloud instance, and executing the remaining portion may comprise processing data from the child nodes by the second cloud instance.

In some examples, the system may comprise multiple task queues where each task queue is configured to perform a particular type of task. When the request to execute the task is received, the task queue may be selected based on the type of task requested. Additionally, a second task queue may be selected for a subsequent task, where the completion of the original task is a prerequisite for the initiation of execution of the subsequent task. The second task queue may be selected based on the task type of the subsequent task. The subsequent task may then be added to the second task queue.

In some examples, if a cloud instance determines that the performing of a task or a portion of a task is not complete and the time budget for performing the task or the portion of the task will expire soon, the cloud instance may add another request to the task queue for completing the performing of the task or the portion of the task.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 4A and 4B depict example task queues.

DETAILED DESCRIPTION

Figure 1:
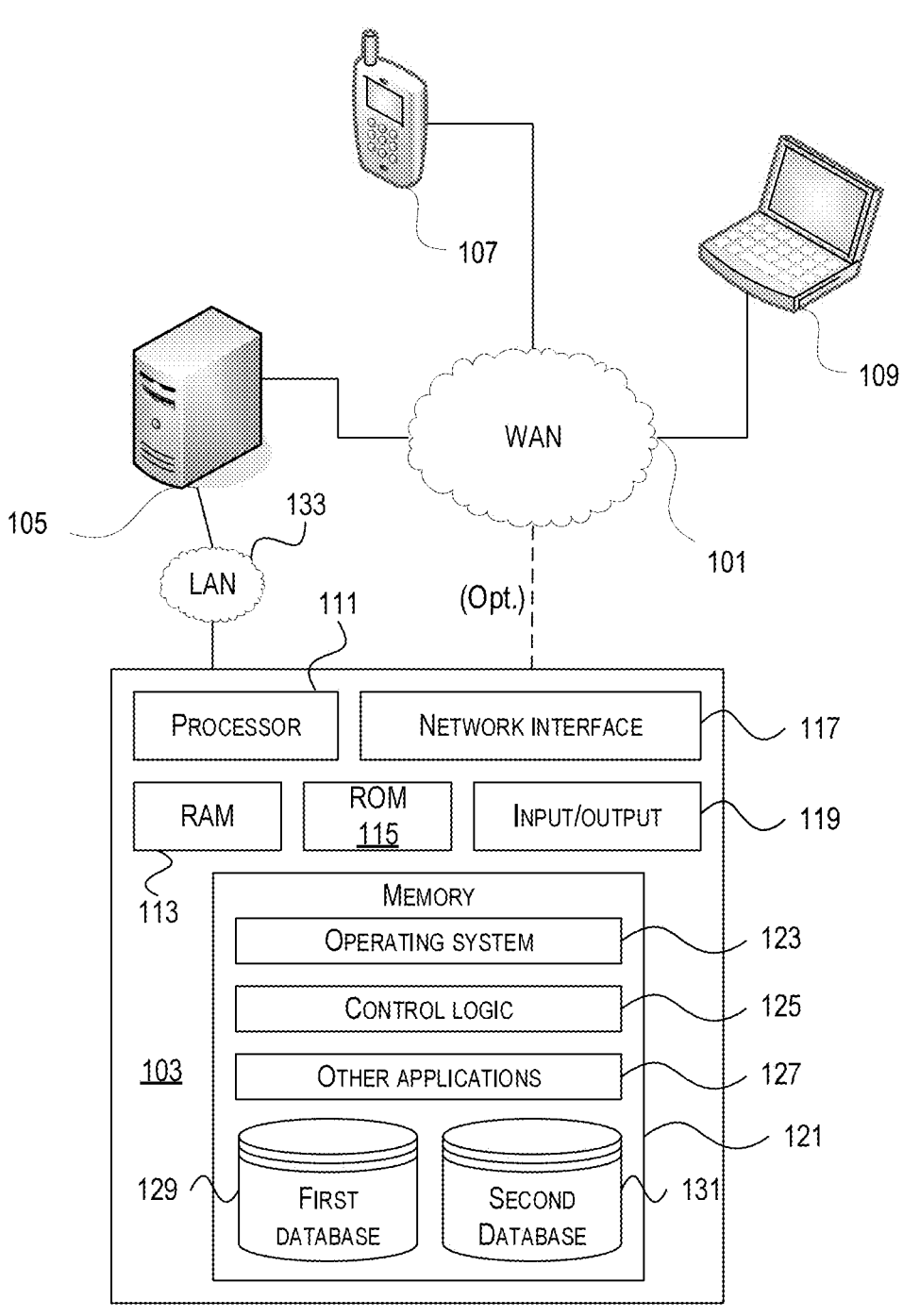
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration, the various embodiments in which aspects described herein may be practiced. It is to be understood that other embodiments may be utilized, and structural and functional modifications may be made without departing from the scope described herein. Likewise, various aspects are capable of other embodiments and being practiced or carried out in various ways.

One problem associated with most existing software applications or computing tasks may be that their codes are written to be performed linearly by a single computing device or a single cloud instance in a cloud computing platform. For example, in typical batch processing of data by a cloud instance, the single cloud instance may request a batch of data, process the batch of data, and then request the next batch of data for processing. Similarly, if the data is represented in a multi-tiered data structure, the single cloud instance may process data in each tier. If the data is represented in a tree structure, the single cloud instance may start processing data from the root node of the tree structure and then recursively handle the processing of the child nodes. The codes for these existing software applications or computing tasks may not be deployable for distributed and parallel processing by multiple cloud instances in existing cloud computing platforms to decrease the overall execution time. While various techniques for parallelizing execution of software applications/computing tasks in the existing cloud computing platforms are now available (e.g., multi-threading, message passing, task partitioning, etc.), the codes and architecture for the applications/computing tasks may need to be rewritten or redesigned significantly to implement these parallel processing techniques. Examples of applications that may need significant modification for parallel execution may be legacy applications that still fulfill the application users' needs but are too expensive to replace, applications designed and written by third parties, internally developed customer applications, client and server-based applications, client workstation applications, proprietary client applications running on proprietary architectures and operating systems, and so on. Furthermore, the updated code may need to be tested extensively. Such rewriting, restructuring, and testing the code, enabling the applications/tasks to be distributed to and executed concurrently by multiple cloud instances, are expensive and time-consuming Given these impediments, businesses and customers using cloud computing platforms may not be able to adapt their existing software applications/computing tasks to execute parallelly in cloud computing environments.

As a general introduction to the subject matter described in more detail below, aspects described herein are directed towards a system and method that may enable existing software applications to be transformed from linear processing to distributed and parallel processing in cloud computing platforms. The system and method described herein may combine the cloud-centric, distributed, and parallel processing infrastructure in cloud computing platforms with functionalities or a suite of libraries that enable the linear applications to execute parallelly in the cloud computing platforms. The system and method described herein enable the parallel execution based on the data structure of the data that will be processed during the execution of the task to reduce overall execution time. For example, processing of data in each batch in a typical batch processing of data, data in a single tier of a multi-tiered data structure, and data for each node in a tree data structure may be assigned to a cloud instance, thereby enabling multiple cloud instance to process various portions of the data concurrently. As a result, existing software applications usually written or designed to perform linearly may take advantage of the highly scalable distributed and parallel processing infrastructure in cloud computing platforms and reduce overall execution time without extensively rewriting and restructuring the applications' codes.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "execution" and "performing," and similar terms are meant to include both direct and indirect execution and/or performance of a task. The use of the terms "software applications," "applications," "computing tasks," "portions of a task," "sub-tasks," and "tasks," and similar terms may be meant to include a unit of execution to be performed by a cloud instance.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client devices 107, 109. Data server 103 provides overall access, control, and administration of databases and control software to perform one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed websites hosted by web server 105. Client devices 107, 109 may be used in concert with data server 103 to access data stored therein, or may be used for other purposes. For example, from the client device 107, a user may access web server 105 using an Internet browser, as is known in the art, or by executing a software application that communicates with web server 105 and/or data server 103 over a computer network (such as the Internet).

Servers and applications may be combined on the same physical machines, retain separate virtual or logical addresses, or reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling the overall operation of the data server 103. Data server 103 may further include random access memory (RAM) 113, read-only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. The functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular computing tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
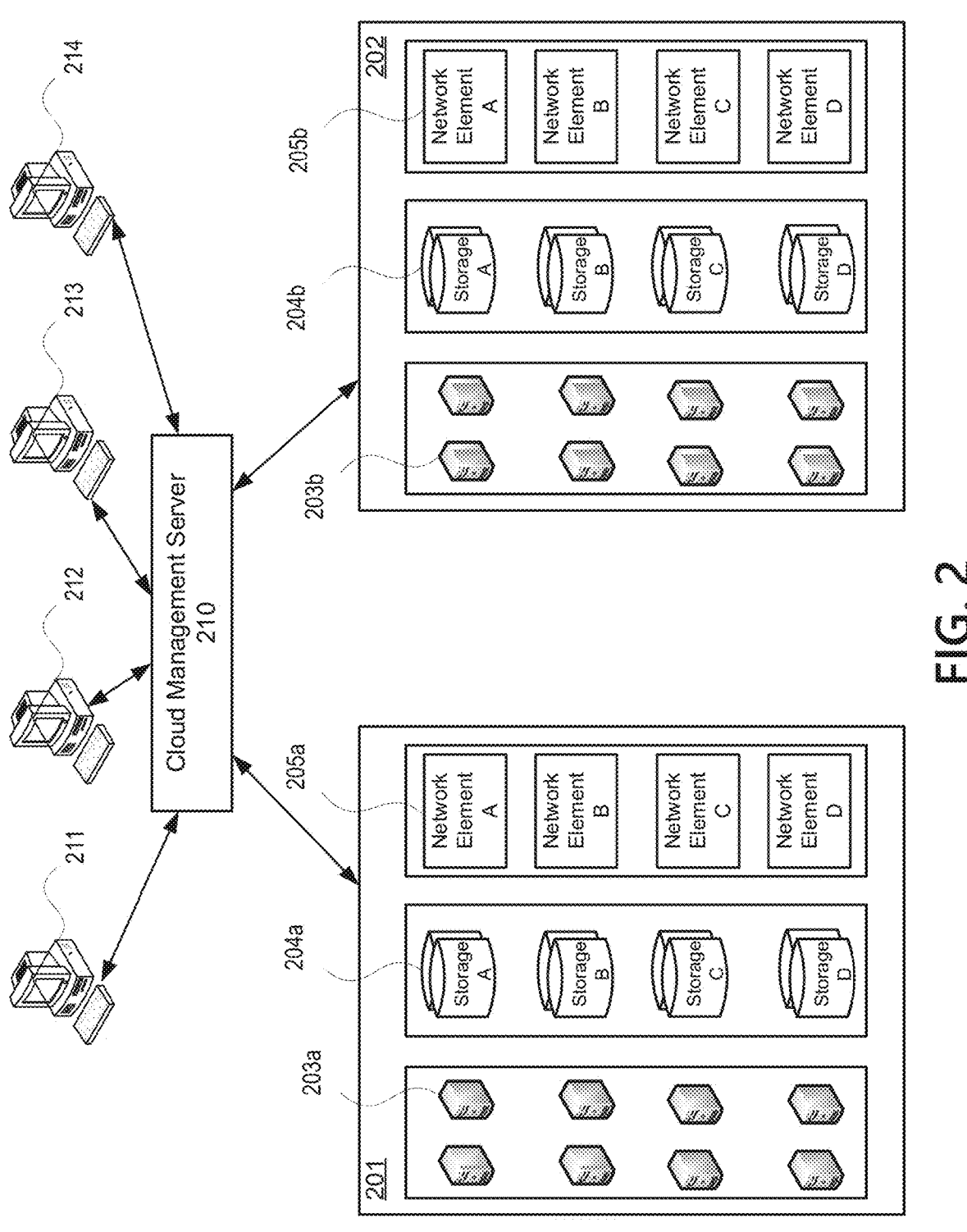
FIG. 2 depicts an illustrative cloud-based system architecture that may be used in accordance with one or more illustrative aspects described herein.

With further reference to FIG. 2, some aspects described herein may be implemented in a cloud-based environment. FIG. 2 illustrates an example of a cloud computing environment or a cloud computing platform. As seen in FIG. 2, client devices 211-214 may communicate with a cloud management server 210 to access the computing resources (e.g., host servers 203a-203b (generally referred herein as "host servers 203"), storage resources 204a-204b (generally referred herein as "storage resources 204"), and network resources 205a-205b (generally referred herein as "network resources 205")) of the cloud system.

The cloud management server 210 may be implemented on one or more physical servers. The cloud management server 210 may run, for example, CLOUD PLATFORM by Citrix Systems, Inc. of Ft. Lauderdale, FL, or OPEN-STACK, among others. Known cloud systems may alternatively be used, e.g., WINDOWS AZURE (Microsoft Corporation of Redmond Wash.), AMAZON EC2 (Amazon.com Inc. of Seattle, Washington), IBM BLUE CLOUD (IBM Corporation of Armonk, New York), or others. The cloud management server 210 may manage various computing resources, including cloud hardware and software resources, for example, host computers 203, data storage devices 204, and networking devices 205. The cloud hardware and software resources may include private and/or public components. For example, a cloud computing platform may be configured as a private cloud platform to be used by one or more particular customers or client devices 211-214 and/or over a private network. In other embodiments, public cloud platforms or hybrid public-private cloud platforms may be used by other customers over an open or hybrid networks.

The cloud management server 210 may be configured to provide user interfaces through which cloud operators, client devices, and cloud customers may interact with the cloud computing platform. For example, the cloud management server 210 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The cloud management server 210 also may include a set of APIs and/or one or more customer console applications with user interfaces configured to receive cloud computing requests from end users via client devices 211-214, for example, requests to create, modify, adjust or destroy cloud instances within the cloud. A cloud instance may be a virtual machine using computing resources managed by the cloud management server 210. Client devices 211-214 may connect to the cloud management server 210 via the Internet or some other communication network, and may request access to one or more of the cloud instances managed by the cloud management server 210. In response to client requests, the cloud management server 210 may include a resource manager configured to select and provision physical resources in the hardware layer of the cloud system via a cloud instance based on the client requests. For example, the management server 210 and additional components of the cloud system may be configured to provision, create, and manage cloud instances and their operating environments (e.g., hypervisors, storage resources, services offered by the network elements, etc.) for customers at client devices 211-214, over a network (e.g., the Internet), providing customers with computational resources, data storage services, networking capabilities, and computer platform and application support. Cloud computing platforms may also be configured to provide various services, including security systems, application development and testing environments, user interfaces, big data analytics and processing, data storage, data backup, disaster recovery, etc. Certain clients 211-214 may be related, for example, different client devices creating cloud instances on behalf of the same end user, or different users affiliated with the same company or organization. In other examples, certain clients 211-214 may be unrelated, such as users affiliated with different companies or organizations. For unrelated clients, information on the cloud instances or storage of any one user may be hidden from other users.

Referring now to the physical hardware layer of a cloud computing environment, availability zones 201-202 (or zones) may refer to a collocated set of physical computing resources. Zones may be geographically separated from other zones in the overall cloud of computing resources. For example, zone 201 may be a first cloud datacenter located in California, and zone 202 may be a second cloud datacenter located in Florida. Management server 210 may be located at one of the availability zones, or at a separate location. Each zone may include an internal network that interfaces with devices that are outside of the zone, such as the management server 210, through a gateway. End users of the cloud (e.g., clients 211-214) might or might not be aware of the distinctions between zones. For example, an end user may request the creation of a cloud instance having a specified amount of memory, processing power, and network capabilities. The management server 210 may respond to the user's request and allocate the resources to create the cloud instance without knowing whether the cloud instance was created using resources from zone 201 or zone 202. In other examples, the cloud computing platform may allow end users to request that cloud instances (or other cloud resources) are allocated in a specific zone or on specific resources 203-205 within a zone.

In this example, each zone 201-202 may include an arrangement of various physical hardware components (or computing resources) 203-205, for example, physical hosting resources (or processing resources), physical network resources, physical storage resources, switches, and additional hardware resources that may be used to provide cloud computing services to customers. The physical hosting resources in a cloud zone 201-202 may include one or more computer servers 203, such as the virtualization servers 301 described above, which may be configured to create and host cloud instance instances. The physical network resources in a cloud zone 201 or 202 may include one or more network elements 205 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 201-202 may include storage disks (e.g., solid state drives (SSDs), magnetic hard disks, etc.) and other storage devices.

The example cloud computing platform shown in FIG. 2 also may include a task management system (as described in FIG. 3) with additional hardware and/or software resources configured to receive requests to execute various computing tasks from client devices 211-214, cloud operators, cloud instances, cloud customers and/or the task management system itself. The task management system may reside in the cloud management server 210. The task management system may create and manage cloud instances for executing or performing the requested tasks. On receiving task requests, the task management system may distribute the task requests to various cloud instances managed by the task queue. The task requests may be executed by a single cloud instance. Additionally or alternately, various portions of a task may be executed concurrently by multiple cloud instances.

Task Management System

Figure 3:
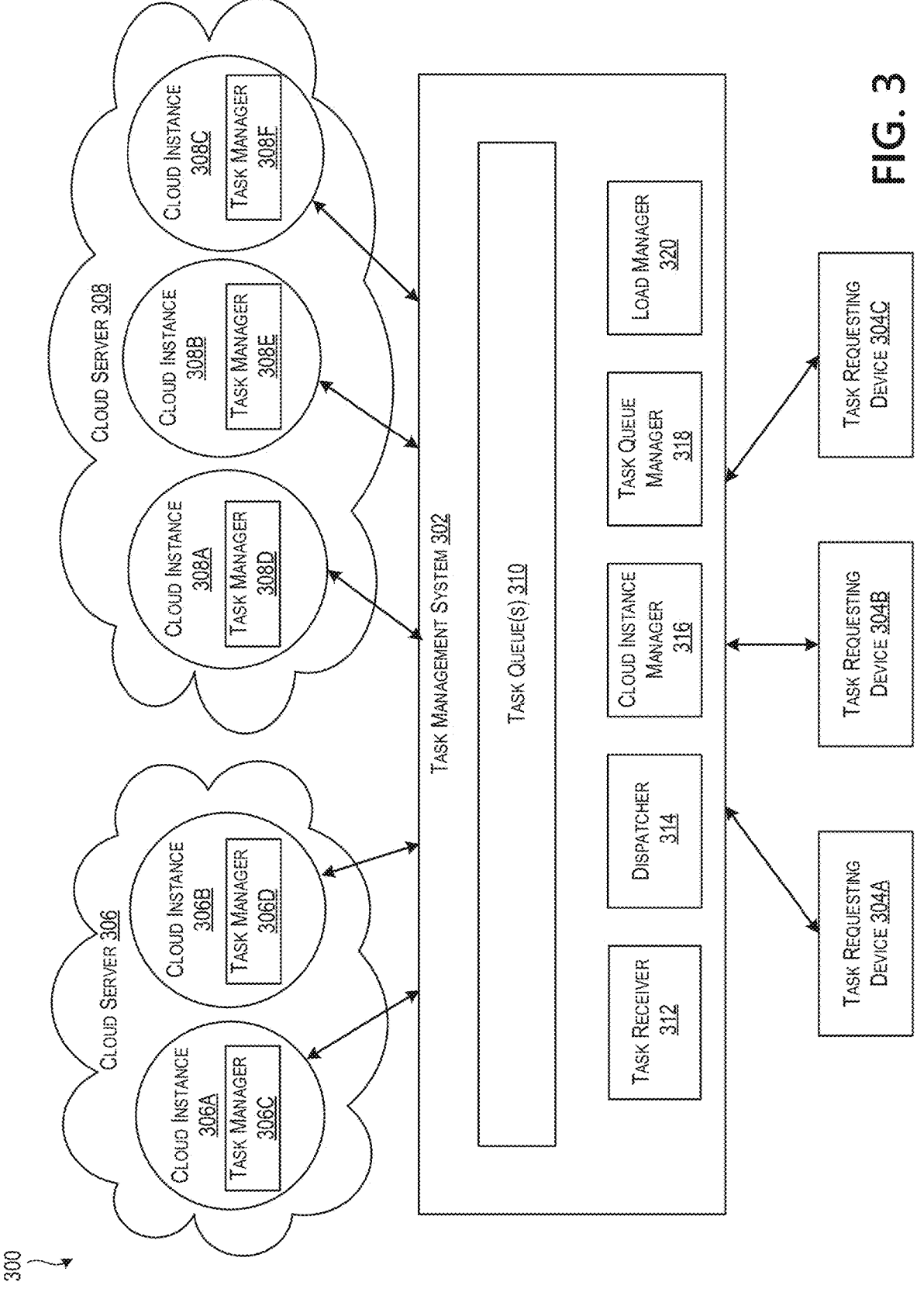
FIG. 3 depicts a schematic diagram showing an example task management system distributing tasks or sub-tasks to cloud instances.

FIG. 3 depicts a schematic diagram showing an example cloud computing environment 300 comprising a task management system 302 for distributing and managing serial and parallel executions of computing tasks. The cloud computing environment 300 may comprise one or more task requesting devices (e.g., the task requesting devices 304A-C), a task management system 302, and one or more host cloud servers hosting cloud instances (e.g., the cloud server 306 hosting the cloud instances 306A-B and the cloud server 308 hosting the cloud instances 308A-C). For the sake of the current discussion, only three task requesting devices, one task management system, and two cloud servers are shown in FIG. 3. However, any number of task requesting devices and cloud servers may be coupled to the task management system 302. References to the task requesting devices may include users of the requesting devices.

The task requesting devices 304A-C, the cloud servers 306, 308, and/or the cloud instances 306A-B, 308A-C in the cloud servers may be coupled to the task management system 302 via one or more network(s) (not shown in FIG. 3). The network(s) may comprise one or more of any of various types of information distribution networks, such as, without limitation, a satellite network, a telephone network, a cellular network, a Wi-Fi network, an Ethernet network, an optical fiber network, a coaxial cable network, a hybrid fiber-coax network, and/or so on. In addition, the network(s) may comprise an Internet Protocol (IP) based network (e.g., the Internet) or other types of networks. The network(s) may comprise, for example, the wide area network 101, the local area network 133, or a computer network.

The task requesting devices 304A-C may be configured to send computing tasks to the task management system 302. The tasks may be related to developing and testing applications, big data analytics and processing, data storage, data backup, disaster recovery, etc. The tasks may be programmed or designed to run linearly on one computing device or cloud instance. Additionally or alternatively, the tasks may be programmed to run parallelly on multiple computing devices and/or cloud instances. The task requesting devices 304A-C may request the task management system 302 to execute the tasks serially on one cloud instance or parallelly on multiple cloud instances. The task requesting devices 304A-C may further request how many cloud instances are to be used for a parallel execution of a task or which cloud server they prefer to execute the tasks. Alternatively, the task requesting devices 304A-C may not specify whether to execute the task serially or parallelly, and the task management system 302 may determine whether to execute the task serially or parallelly. The task requesting devices 304A-C may also request to parallelly execute a task that does not comprise any parallel processing techniques and has been programmed to run linearly on a single cloud instance.

A task requesting device of the task requesting devices 304A-C may comprise, for example, a smartphone, a personal computer, a tablet, a desktop computer, a laptop computer, a gaming device, a virtual reality headset, or any other computing device. Additionally, a task requesting device of the task requesting devices 304A-C may comprise, for example, the client devices 107, 109, the client devices 211-214, a cloud operator (e.g., any hardware components and/or software applications of the cloud management server 210 in FIG. 2), or a cloud customer as discussed above in connection with FIGS. 1-2. A task requesting device of the task requesting devices 304A-C may also comprise a client agent, a software application executing on the task requesting device that facilitates communications with remote and/or virtualized resources in the task management system 302, and the cloud instances in the cloud servers 306, 308. In one illustrative embodiment, the client agent may be Citrix Workspace Application by Citrix Systems, Inc. of Fort Lauderdale, Florida.

The cloud servers 306, 308 may be configured to provide computing resources, storage, and/or network resources for various computing tasks requested by the task requesting devices 304A-C and/or managed by the task management server 302. The cloud servers 306, 308 may be the cloud management server 210 in FIG. 2, The cloud servers 306, 308 may be known cloud systems, such as WINDOWS AZURE (Microsoft Corporation of Redmond Wash.), AMAZON EC2 (Amazon.com Inc. of Seattle, Washington), IBM BLUE CLOUD (IBM Corporation of Armonk, New York), or others. The cloud servers 306, 308 may be configured as private cloud platforms, public cloud platforms, or hybrid public-private cloud platforms. The cloud servers 306, 308 may belong to the same business/organization, different businesses/organizations, or be geographically separated. The cloud servers 306, 308 may be configured, upon instructions from the task management system, to create cloud instances (e.g., the cloud instances 306A-B, 308A-C) where the cloud instances may comprise necessary computing, storage, and/or network resources for executing a task requested by a task requesting device.

The task management system 302 may be configured to manage the execution of tasks requested by any of the task requesting devices 304A-C by using the cloud instances of the cloud server 306, 308. The task management system 302 may be further configured to manage, create, and/or destroy the cloud instances for executing the tasks in the cloud servers 306, 308. The task management system 302 may execute the tasks serially or parallelly on the cloud instances in the cloud server 306, 308, and the task requesting devices 304A-C may be agnostic regarding whether the tasks are being executed serially or parallelly. Furthermore, the task management system 302 may execute a linearly programmed task parallelly in the cloud servers. For example, the task management system 302 may enable various portions of an existing, linearly programmed computing task to execute parallelly on multiple cloud instances of the cloud server 306, 308 by executing multiple instances of the same task on the multiple cloud instances but assigning different portions of data that was supposed to be processed during the execution of the task to different cloud instances. The task management system 302 and/or the cloud instances managed or created by the task management system 302 may determine the different portions of data that may be parallelly processed based on the organization of the data associated with the tasks (e.g., the data structures being used to store and/or organize the data). Additionally or alternately, the task management system 302 may execute different portions of the task code at different cloud instances. The task management system 302 and/or the cloud instance may determine the different portions of the code that may be parallelly processed based on the organization of the code.

The task management system 302 may be implemented on one or more physical servers, or on the cloud management server 210 in FIG. 2. The task management system 302 may run, for example, CLOUD PLATFORM by Citrix Systems, Inc. of Ft. Lauderdale, FL, or OPENSTACK, among others. The task management system 302 can be implemented on the cloud management server 210 as a Software-as-a-Service (SaaS) application, a web-architected application, or a cloud-delivered service. The task management system 302 may be implemented in the context of any computer-implemented system, including a database system, a multi-tenant environment, or a relational database implementation. The task management system 302 may be configured to host various services, such as virtual desktops, web service clients, virtual applications, web applications, and/or the like, to deliver the ability of parallel execution of tasks to the task requesting devices 304A-C. The task requesting devices 304A-C may send or submit a task request via the various services.

The task management system 302 may be variously configured and include software components such as a task receiver 312, a dispatcher 314, a cloud instance manager 316, a task queue manager 318, a load manager 320, and a distribution manager 322. The task receiver 312 may be configured to provide a common interface and facility to the task requesting devices for receiving task requests and add the received task requests to the task queues 310.

The task management system 302 may comprise an interface to various cloud servers (e.g., the cloud servers 306, 308). Different cloud servers, management systems, and environments may be supported by the task management system 302. The cloud instance manager 316 may create and monitor cloud instances in the cloud servers. The cloud instance manager 316 may dynamically create cloud instances for a task based on the computing, memory, and/or network resources needed to execute the task. Alternatively, the cloud instance manager 316 may create and monitor cloud instances of different computing, storage, and/or network capabilities and select one or more cloud instances for a task based on the resources needed to execute the task. The cloud instance manager 316 may also adjust the resources of the cloud instances based on the needs of one or more tasks, and group cloud instances in families based on their capabilities and/or resources. The cloud instance manager 316 may destroy cloud instances upon determining that those cloud instances are no longer required.

The load manager 320 may monitor the availability and/or unavailability of cloud instances in cloud servers to execute tasks. Additionally, the load manager 320 may monitor the computing, storage, and/or network capabilities of the available/unavailable cloud instances. The load manager 320 may periodically send signals to the cloud instances and requests their current status (e.g., whether the cloud instances are available or not available) and/or computing, storage, and network capabilities. Alternately, the cloud instances may periodically send signals to the load manager 320 regarding their availabilities and/or computing, storage, and network capabilities.

The task queue manager 318 may keep track of executed and/or not yet executed tasks in one or more task queues 310. The task queue manager 318 may arrange tasks yet to be distributed based on priorities assigned to the task, amount of time needed to complete the task, computing resources needed, etc. Upon receiving a task from a task requesting device, the task queue manager 318 or the task receiver 312 may add the task to the task queues 310. In some examples, software processing queues may be used to keep track of tasks. Software processing queues and their real-time statistical analyses may provide the task queue manager 318 with data and timely predictive insights into the task distribution of the task management system 302, quality-of-service (QoS), and quality-of-execution (QoE), making possible dynamic and intelligent resource monitoring and resource management, and/or performance monitoring, and/or automated adjusting and creation of cloud instances on the cloud servers. Examples of software processing queues that may be used herein include event queues, data queues, FIFO (first-in-first-out) buffers, input/output (I/O) queues, packet queues, and/or event queues, and so on. Such queues and buffers may be of diverse types with different scheduling properties, but preferably need to be emptied by distributing tasks in the task queues 310 to one or more cloud instances. Some or all of the data related to the task queues 310 may be stored using one or more databases. Databases may include but are not limited to relational databases, hierarchical databases, distributed databases, in-memory databases, flat file databases, XML databases, NoSQL databases, graph databases, and/or a combination thereof.

The dispatcher 314 may coordinate with the load manager 320, the cloud instance manager 316, and the task queue manager 318 to determine a task that is yet to be distributed to a cloud instance and a cloud instance that is available to execute the task, and assign the selected task to the selected available cloud instance. Alternately, an unavailable cloud instance may monitor the task queues 310 and request to execute a task from the task queues 310. The dispatcher 314 may then dispatch or assign the requested task to the cloud instance.

In some examples, the dispatcher 314 may also comprise hardware and/or software components that, upon determining to initiate execution of a task, enable parallel execution of the task by determining multiple sub-tasks that may be assigned to multiple cloud instances, adding the sub-tasks to the task queues 310, and/or assigning or dispatching the sub-tasks from the task queues 310 to clouds instances in the cloud server 306, 308. The dispatcher 314 may determine the sub-tasks based on the code or data structure of the data to be processed during executions of the sub-tasks. Additionally, the cloud instances (e.g., cloud instances 306A-B, 308A-C) created or managed by the task management system 302 or the cloud instance manager 316 may comprise hardware and/or software components (e.g., the task managers 306C, 306D, 308D, 308E, and 308F in cloud instances 306A, 306B, 308A, 308B, and 308C respectively) that enable parallel execution by determining portions of the code or data that may be executed or processed by other cloud instances and send requests to the task management system 302 to add sub-tasks related to the determined portions to the task queues 310. Specific functions that may be applied by the task management system 302 and/or the task managers 306C-D, 308D-F to enable parallel execution of tasks may comprise auto load share, distribution and accessibility across multiple clouds instances within the cloud, auto-clone as and when necessary for automated capacity and performance balancing, scale vertically and horizontally without manual initiation, auto-restart in different locations if the tasks or portions of the tasks encounter critical errors or failure to operate, and seamless integrations of requested tasks within the cloud as if the tasks have been fully and wholly reconfigured for distributed and parallel execution in the cloud.

Alternately, the dispatcher 314 may wrap existing code for a requested task with one or more application programming interfaces (APIs) that enable the code, once deployed with the wrapper, to be executed parallelly on multiple cloud instances. These APIs may be incorporated into a library and preconfigured to be "off the shelf" available APIs specifically mapped for the type of computing job requested in the task. When execution of a wrapped task is initiated in a cloud instance, the APIs may determine multiple sub-tasks from the wrapped task, perform one of the sub-tasks, and sent a request to the task management system to add the other sub-tasks to the task queues 310 such that the other sub-tasks may be assigned or dispatched to other clouds instances in the cloud server 306, 308. The dispatcher 314 may further wrap the sub-tasks with the APIs before dispatching them to the other cloud instances. Alternately, before being dispatched to a cloud instance, the APIs of a wrapper task may enable identification of sub-tasks and addition of the identified sub-tasks to the task queues 310. Example APIs may comprise JAVA-based command-level programs, JAVA-based thin client server-based applications, MICROSOFT WINDOWS® thin client server-based applications, fat client applications, third party applications, and/or mainframe applications.

The task management system may be configured to receive requests to execute various types of tasks. For example, the task management system may receive requests to back up databases, perform computations on data present in databases, test new applications, retrieve data from databases, etc. FIG. 4A illustrates an example of a single task queue 402 that a task management system may maintain (e.g., the task management system 302 in FIG. 3) to store various types or any types of tasks. For example, the task queue 402 in FIG. 4A may store tasks of task types A, B, and C. Similarly, the cloud instances (e.g., the cloud instances 404A-C) maintained by the task management system may be configured to execute any type of task. For example, the cloud instances 404A-C may be configured to execute task types A, B, and C when assigned by the task management system. When the cloud instances 404A-C requests a task from the task queue 402, the cloud instances 404A-C may be agnostic about which type of task it will be assigned. Similarly, when a task is dispatched to one of the cloud instances 404A-C, the dispatching may not consider the task type.

FIG. 4B illustrates another example where multiple task queues (e.g., the task queues 412, 414, 416) may be maintained by a task management system (e.g., the task management system 302 in FIG. 3). Each task queue 412, 414, or 416 may be configured for a particular type of task. For example, the task queue 412 may be configured to store tasks of type A, the task queue 414 may be configured to store tasks of type B, and the task queue 416 may be configured to store tasks of type C. When the task management system receives a request to execute a task, the task management system may determine the type of task requested in the task request, select a task queue based on the type of the task, and then add the task request to the selected task queue. Additionally, the task management system may determine that a task may be split into different types of sub-tasks that are dependent or independent of each other. If the sub-tasks may be executed independently of each other, the sub-tasks may be added to the task queues 412, 414, 416 based on the task types of the sub-tasks. If the sub-tasks are dependent on each other, a first sub-task may be added to a task queue associated with the task type of the first sub-task, and execution of the first sub-task may be initiated. After completing the first sub-task and completing the first sub-task is a prerequisite to the initiation of a second sub-task, another task queue may be selected for the second sub-task based on the task type of the second sub-task. Then the second sub-task may be added to the selected task queue.

Additionally, some of the sub-tasks may be dependent on other sub-tasks that may be independently performed. For example, the task for backing up a database may be divided into several sub-tasks, such as a first sub-task of copying the database to a secondary server, the second sub-task of backing up the database in the secondary server, the third sub-task of making a secondary copy of the database for redundancy, and then the fourth sub-task of storing the secondary copy. The second sub-task of backing up the database in the secondary server and the third sub-task of making a secondary copy are dependent on the completion of the first sub-task of copying the database to the secondary server. Therefore, the second and third sub-tasks may be added to the task queues after completing the first sub-task. Alternatively, all sub-tasks may be added to the task queues simultaneously, but the second and third sub-tasks may be dispatched after completing the first sub-task. The second and third sub-tasks may be executed concurrently on two different cloud instances. After the third sub-task is completed, the fourth sub-task may be dispatched.

The task management system may also maintain a family of cloud instances for each queue 412, 414,4. For example, the cloud instances 418A-B may be associated with the task queue 412 for task type A, the cloud instance 420 may be associated with the task queue 414 for task type B, and the cloud instances 422A-B may be associated with the task queue 416 for task type C. In addition, the cloud instances associated with a particular task queue may be configured or created to perform the type of tasks related to the task type associated with the particular task queue. For example, if the task queue 612 is configured to store tasks for testing new applications, the cloud instances 418A and 418B may be configured with environments for testing the new applications.

Figure 5:
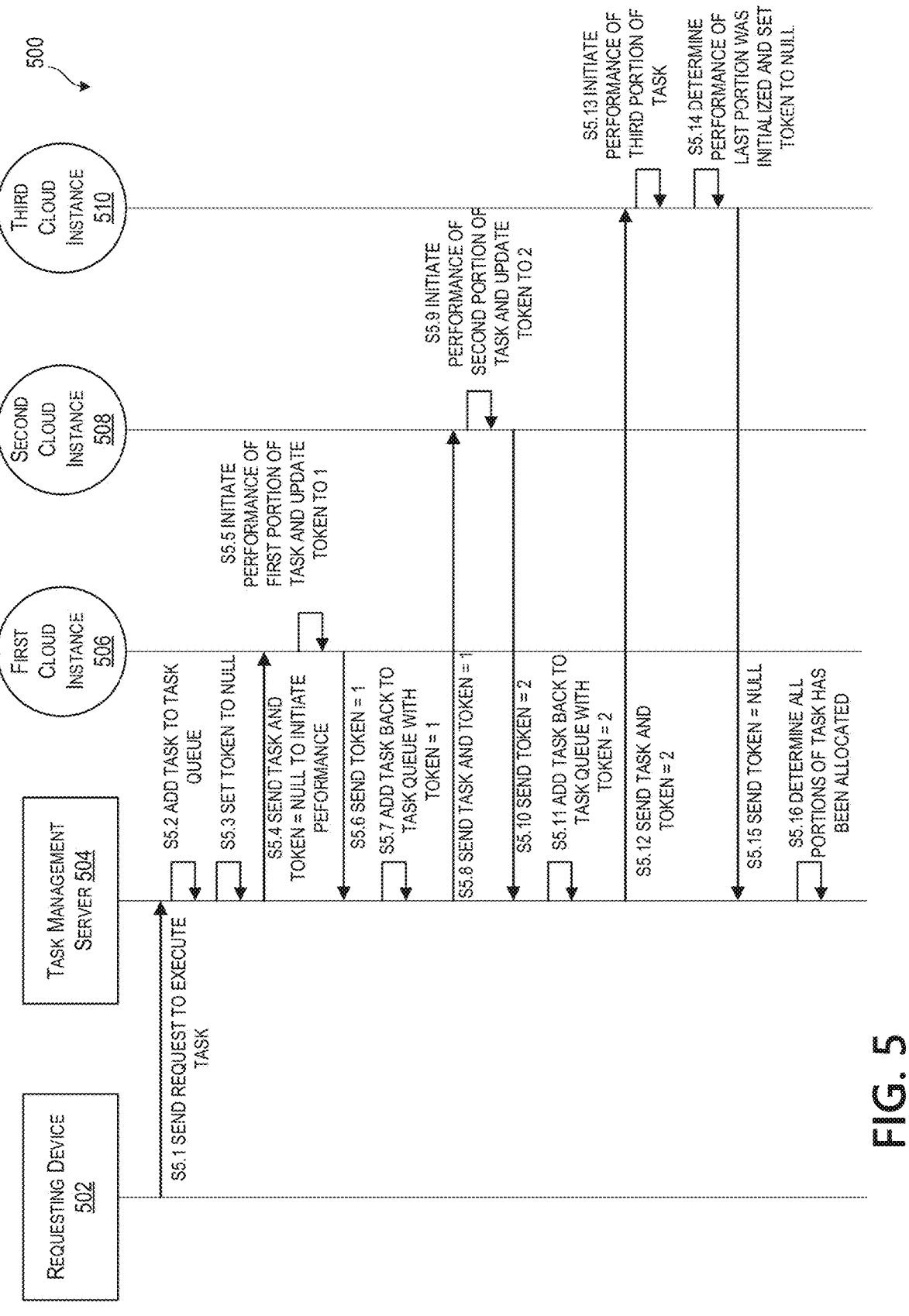
FIG. 5 is a sequence diagram showing an example method for distributing various portions of a task using tokens.

FIG. 5 is a sequence diagram illustrating an example workflow 500 for distributing various portions of a task or sub-tasks using tokens. The actions in the workflow 500 may be performed in different orders and with different, fewer, or additional actions than those illustrated in FIG. 5. Multiple actions can be combined in some implementations.

The workflow 500 that begins at step S5.1 where a requesting device 502 (e.g., the task requesting devices 304A-C in FIG. 3, the client devices 107, 109 in FIG. 1, the client devices 211-214 in FIG. 2, a cloud operator, or a cloud customer) may send a request to execute a task to a task management server 504 (e.g., the task management server 302 in FIG. 3, the cloud management server 210 in FIG. 2, etc.). The task may be programmed or designed to execute linearly. At step S5.2, the task management server 504 may add the task request to the task queue maintained by the task management server 504. At step S5.3, the task management server 504 may initialize a first type of token, such as a null character, and add the first type of token to the task queue with the task. Any other non-alphanumeric characters may be used as the first type of token. Examples of non-numeric characters "!", "@", "#", "&", "(", "[", "{", ":", ";", "", "?", "/", "*", "$", "", "+", "=", and/or "<".

At step S5.4, the task management server 504 may dispatch or assign the task and the associated first type of token to the first cloud instance 506 such that the first cloud instance 506 may initialize the execution of the task. The task management server 504 may determine that the first cloud instance 506 is available and send the task and the first type of token to the first cloud instance 506. Alternatively, the first cloud instance 506 may request the task from the task management server 504. The task management may also create the first cloud instance 506 specifically for the execution of the task.

At step S5.5, the first cloud instance 506 may initiate the performance of a first portion of the task. For example, if the task involves batch data processing, the first cloud instance 506 may initiate the processing of the first batch of data. The first cloud instance may determine the first batch of data based on determining that the token received with the task is the first type of token. The first cloud instance 506 may then update the token to a second type of token. The second type of token may be alphanumeric characters, such as "1." Other types of alphanumeric characters may also be used as the second type of token, such as "A", "a", "I", etc. The second type of token may indicate which portion of the task is being performed by the first cloud instance 506 (e.g., the token "1" indicates the first batch).

At step S5.6, the first cloud instance 506 may send the updated token to the task management server 504 while performing the first portion of the task. At step S5.7, the task management server 504 may add a second task to the task queue accompanied with the updated token "1." At step S5.8, the second task may be dispatched to a second cloud instance 508. The dispatching at step S5.8 may be accompanied by the updated token received from the first cloud instance 506. The task management server 504 may send the task and the updated token to the second cloud instance 508 after determining that the second cloud instance is available, or the second cloud instance 508 may request the task from the task management server 504. Alternatively, the task management server 504 may create the second cloud instance 508 specifically to execute the remaining portion of the task.

At step S5.9, the second cloud instance 508 may initiate the performance of a second portion of the task while the first cloud instance 506 is concurrently performing the first portion of the task. For example, the second cloud instance 508 may process the second batch of data of a batch data processing task while the first cloud instance is processing the first batch of data. The second cloud instance 508 may determine to perform the second portion of the task based on the token, received with the request to perform the remaining portion, indicating that another cloud instance is already executing the first portion. The second cloud instance 508 may then update the token to another second type of token, such as "2," to indicate that the second portion is being performed by the second cloud instance 508. At step S5.10, the second cloud instance 508 may send the updated token to the task management server 504 while performing the second portion of the task. At step S5.11, the task management server 504 may add a third task to the task queue accompanied with the updated token "2." At step S5.12, the third task with the updated token "2" may be dispatched to a third cloud instance 510.

At step S5.13, the third cloud instance 510 may initiate the performance of a third portion of the task while the first cloud instance 506 is concurrently performing the first portion of the task and the second cloud instance 508 is performing the second portion of the task. For example, the third cloud instance 510 may initiate the processing of the third batch of data of the batch data processing task while the first and second cloud instances are processing the first and second batches of data. The third cloud instance 510 may determine to perform the third portion of the task based on the received token "2" indicating that other cloud instances are already executing the first and second portions. If the third cloud instance 510 determines that more portions need to be processed, the third cloud instance 510 may then update the token to another second type of token, such as "3," and send the updated token to the task management server 504. However, if the third cloud instance determines that the last portion of the task has been initialized at step S5.14, the third cloud instance 510 may update the token to a third type of token. Similar to the first type of token, the third type of token may be a null character. However, other non-alphanumeric characters may also be used as the third type of token. Examples of non-alphanumeric characters that may be used as the third type of token may include "!", "@", "#", "&", ")", "]", "}", ":", ";", "'", "?", "\", "*", "$", "'", "+", "=", and/or ">".

At step S5.15, the third cloud instance 501 may send the updated token to the task management server 504. Upon receiving the token and determining that the token is a null character or another non-alphanumeric character, the task management server 504 may determine that all portions of the original task have been assigned for execution. Using the algorithm described in the workflow 500, various portions of an original requested linear task may be assigned to multiple cloud instances and executed concurrently on the multiple cloud instances. After receiving indications from the first, second, and third cloud instances that performances of all the task portions have been completed, the task management server 504 may gather the results from all the cloud instances and send a report or results of the task performances to the task requesting device 502.

Figure 6A:
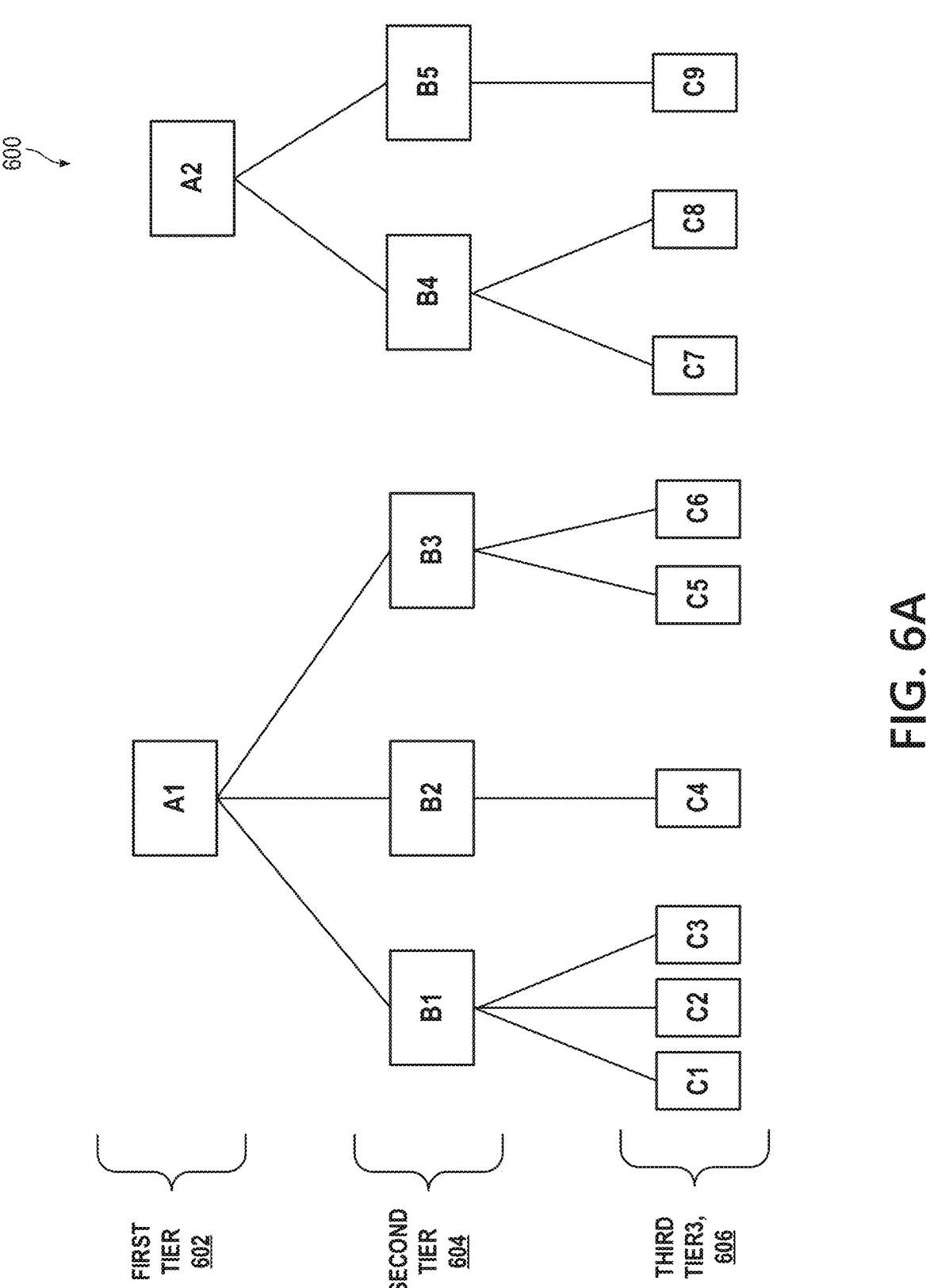
FIGS. 6A, 6B, and 6C collectively depict example methods for distributing various portions of task data represented in a tiered data structure.

In some embodiments, the data to be processed for a task may be represented in a multi-tiered data structure. FIG. 6A illustrates an example of a multi-tiered data structure 600 that may comprise a first tier 602 of data, a second tier 604 of data, and a third tier 606 of data. A1 and A2 in the first tier 602, B1, B2, B3, B4, and B6 in the second tier 604, and C1, C2, C3, C4, C5, C6, C7, C8, and C9 in the third tier 606 may represent different objects. For example, a task management server or system may receive a task to back up customer databases, where each customer may be associated with a control plane. A1 and A2 in the first tier 602 may represent two control plane objects. B1, B2, and B3 may represent customer objects associated with the control plane object A1, C1, C2, and C3 may represent database objects associated with customer object B1, C4 may represent a database object associated with customer object B2, and C5 and C6 may represent database objects associated with the customer object B3. Similarly, B4 and B5 may represent customer objects associated with the control plane object A2, C7 and C8 may represent database objects associated with customer object B4, and C9 may represent a database object associated with customer object B5.

The code for an existing computing task designed to backup customer databases one by one may iterate through the data structure 600 to identify and backup the databases C1, C2, C3, C4, C5, C6, C7, C8, and C9. However, the system and method described herein may backup all the databases concurrently. While only a three-tier data structure is used to illustrate the algorithms in FIGS. 6B and 6C, data structures of any number of tiers may be processed by the algorithms in FIGS. 6B and 6C.

Figure 6B:
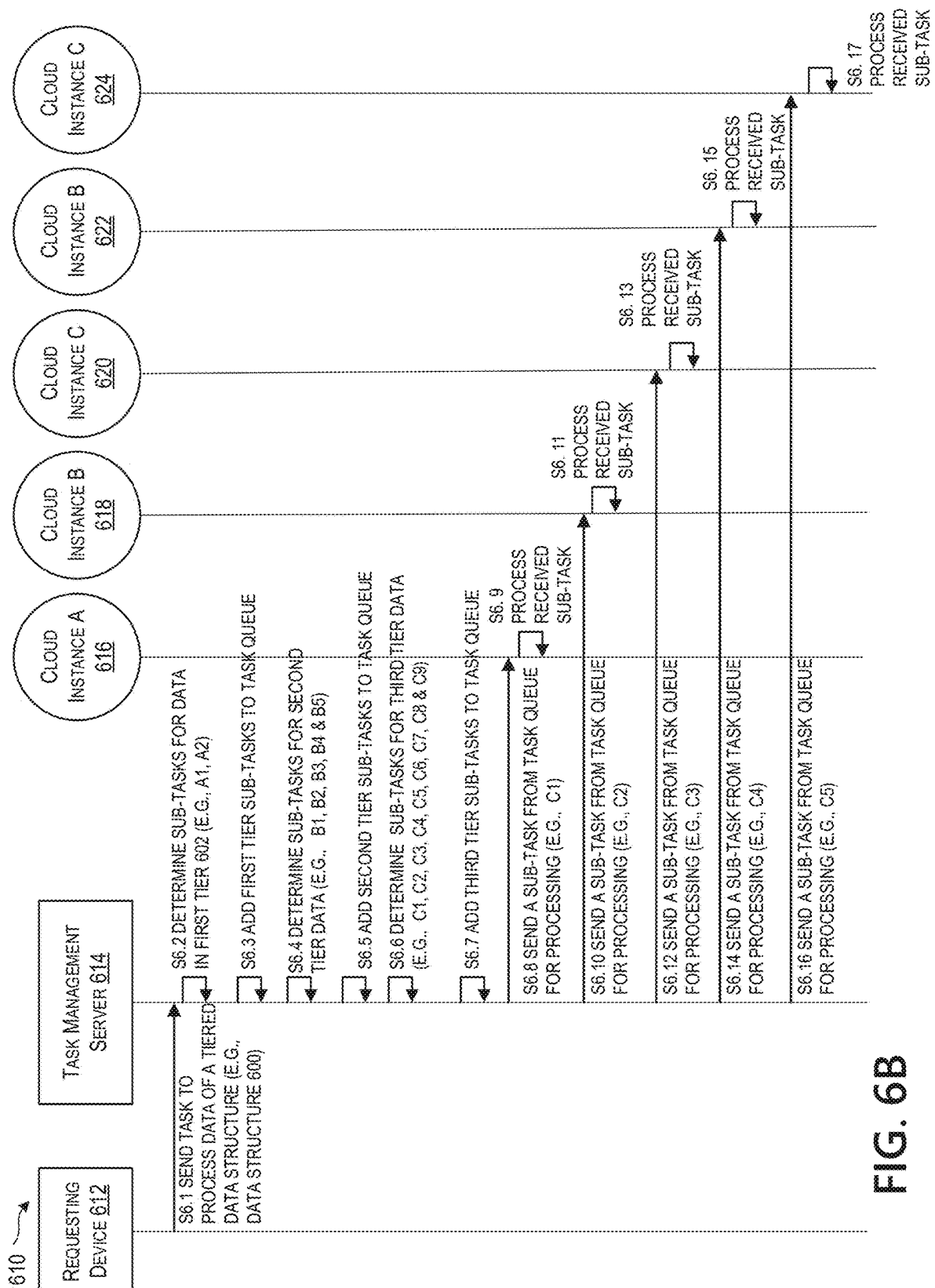

FIG. 6B is a sequence diagram illustrating an example workflow 610 for distributing various portions or sub-tasks of a task for processing data from a multi-tiered data structure. The actions in the workflow 610 may be performed in different orders and with different, fewer, or additional actions than those illustrated in FIG. 6B. Multiple actions can be combined in some implementations.

The workflow 610 that begins at step S6.1 where a requesting device 612 (e.g., the task requesting devices 304A-C in FIG. 3, the client devices 107, 109 in FIG. 1, the client devices 211-214 in FIG. 2, a cloud operator, or a cloud customer) may send a request to execute a task to a task management server 614 (e.g., the task management server 302 in FIG. 3, the cloud management server 210 in FIG. 2, etc.). The task may be programmed or designed to execute linearly. The data to be processed during the execution of the task may be represented in a multi-tiered data structure (e.g., the multi-tiered data structure 600).

At step S6.2, the task management server 614 may determine sub-tasks for data from the first tier of the multi-tiered data structure. For example, the task management server 614 may determine sub-tasks for the objects A1 and A2 in the first tier 602 of the data structure 600. At step 6.3, the task management server 614 may add the sub-tasks for the identified objects in the first tier to the task queue.

At step S6.4, the task management server 614 may determine whether the sub-tasks determined from the first tier can be further divided into more sub-tasks. For the sub-task associated with object A1, the task management server 614 may determine sub-tasks for objects B1, B3, and B3. For the sub-task associated with object A2, the task management server 614 may determine sub-tasks for objects B4 and B5. At step S6.5, the task management server 614 may add the sub-tasks for the objects in the second tier to the task queue.

At step S6.6, the task management server 614 may determine whether the sub-tasks determined from the second tier can be further divided into more sub-tasks. For the sub-task associated with object B1, the task management server 614 may determine sub-tasks for objects C1, C3, and C3; for the sub-task associated with object B2, the task management server 614 may determine sub-tasks for object C4; for the sub-task associated with object B3, the task management server 614 may determine sub-tasks for objects C5 and C6; for the sub-task associated with object B4, the task management server 614 may determine sub-tasks for objects C7 and C8; and for the sub-task associated with object B5, the task management server 614 may determine sub-tasks for objects C9. At step S6.7, the task management server 614 may add sub-tasks for the objects in the third tier to the task queue. The process for identifying more tiers and adding sub-tasks for the identified tier may continue until the last tier is identified and sub-tasks from the last tier are added to the task queue.

The task management server 614 may then assign sub-tasks from the last tier (e.g., the third tier data 606 of the data structure 600) to multiple cloud instances, and the assigned sub-tasks may be executed concurrently by the cloud instances. For example, the task management server 614 may assign the sub-task for object C1 to the cloud instance A 616 at step S6.8, the sub-task for object C2 to the cloud instance B 618 at step S6.10, the sub-task for object C3 to the cloud instance C 620 at step S6.12, the sub-task for object C4 to the cloud instance D 622 at step S6.15, the sub-task for object C5 to the cloud instance E 624 at step S6.16, and so on. The cloud instance A at step S6.9, the cloud instance B at step S6.11, the cloud instance C at step S6.13, the cloud instance D at step S6.15, and the cloud instance E at S6.17 may initiate concurrent performance of their assigned tasks. Alternatively, some of the sub-tasks for data in the last tier may be assigned later than the first round of assignments based on the availability of cloud instances. After receiving indications that all the sub-tasks of the last tier (e.g., the third tier 606 of the data structure 600) have been completed, the task management server 614 may gather the results from all the cloud instances and send a report to the task requesting device 612 or send results from the performances of the sub-tasks to the task requesting device 612.

Figure 6C:
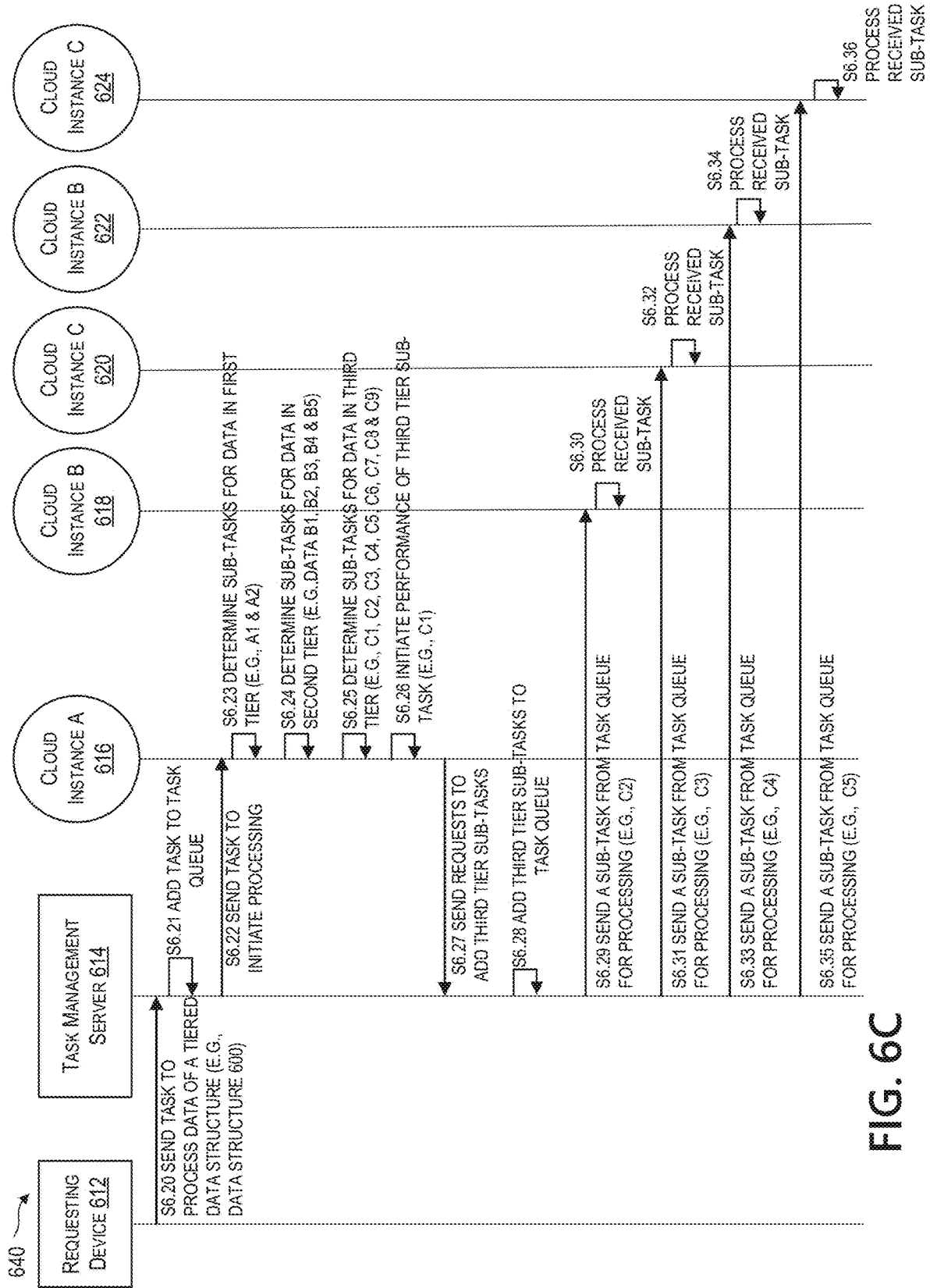

FIG. 6C illustrates an alternate workflow 640 for distributing various portions or sub-tasks of a task for a multi-tiered data structure by a cloud instance that initiates the execution of the task. The actions in the workflow 640 may be performed in different orders and with different, fewer, or additional actions than those illustrated in FIG. 6C. Multiple actions can be combined in some implementations.

The workflow 640 that begins at step S6.20, where the requesting device may send a request to execute a task associated with a multi-tiered data structure (e.g., the multi-tiered data structure 600) to the task management server 614 and the task management server 614 may add the task to a task queue maintained by the task management server 614 at S6.21.

At step S6.22, the task management server 614 may dispatch or assign the task to the cloud instance A 616. The task management server 614 may determine that the cloud instance A 616 is available and send the task to the cloud instance A 616. Alternatively, the cloud instance A 616 may request the task from the task management server 614. The task management may also create the cloud instance A 616 specifically for the execution of the task.

At step S6.23, the cloud instance A 616 may determine sub-tasks from the first tier of the multi-tiered data structure (e.g., the cloud instance A 616 may determine the objects Al and A2 from the multi-tiered data structure 600). At step 6.24, the cloud instance A 616 may determine whether the sub-tasks determined from the first tier can be further divided into more sub-tasks. Based on the sub-task associated with objects A1 and A3, the cloud instance A 616 614 may determine sub-tasks for objects B1, B2, B3, B4, and B5. At step S6.25, the cloud instance A 616 may determine whether the sub-tasks determined from the second tier can be further divided into more sub-tasks. Based on the objects B1, B2, B3, B4, and B5, the cloud instance A 616 may determine sub-tasks for objects C1, C3, C3, C4, C5, C6, C7, C8, and C9. The process for identifying more tiers and adding sub-tasks for the identified tier may continue until the last tier is identified and sub-tasks from the last tier are added to the task queue.

At step S6.26, the cloud instance A 616 may initiate the performance of one of the sub-tasks identified from the last tier. For example, the cloud instance A 616 may initiate processing the data for object C1. At step S6.27, the cloud instance A 616 may send a request to the task management server 614 to add sub-tasks for the other objects (e.g., C2, C3, C4, C5, C6, C7, C8, and C9) in the last tier to the task queue maintained by the task management server 614. At step S6.28, the task management server 614 may receive the sub-tasks for the other objects (e.g., C2, C3, C4, C5, C6, C7, C8, and C9) from the third and last tier and add the sub-tasks to the task queue.

The task management server 614 may then assign sub-tasks from the third tier data to multiple cloud instances such that the assigned sub-tasks may be executed concurrently by the cloud instances. For example, the task management server 614 may assign the sub-task for object C2 to the cloud instance B 618 at step S6.29, the sub-task for object C3 to the cloud instance C 620 at step S6.31, the sub-task for object C4 to the cloud instance D 622 at step S6.33, the sub-task for object C5 to the cloud instance E 624 at step S6.35, and so on. The cloud instance A at step S6.26, the cloud instance B at step S6.30, the cloud instance C at step S6.32, the cloud instance D at step S6.34, and the cloud instance E at S6.36 may concurrently perform their assigned tasks. After receiving indications that all the sub-tasks of the last tier (e.g., the third tier 606 of the data structure 600) have been completed, the task management server 614 may gather the results from all the cloud instances and send a report to the task requesting device 612 or send results from the performances of the sub-tasks to the task requesting device 612.

Figure 7A:
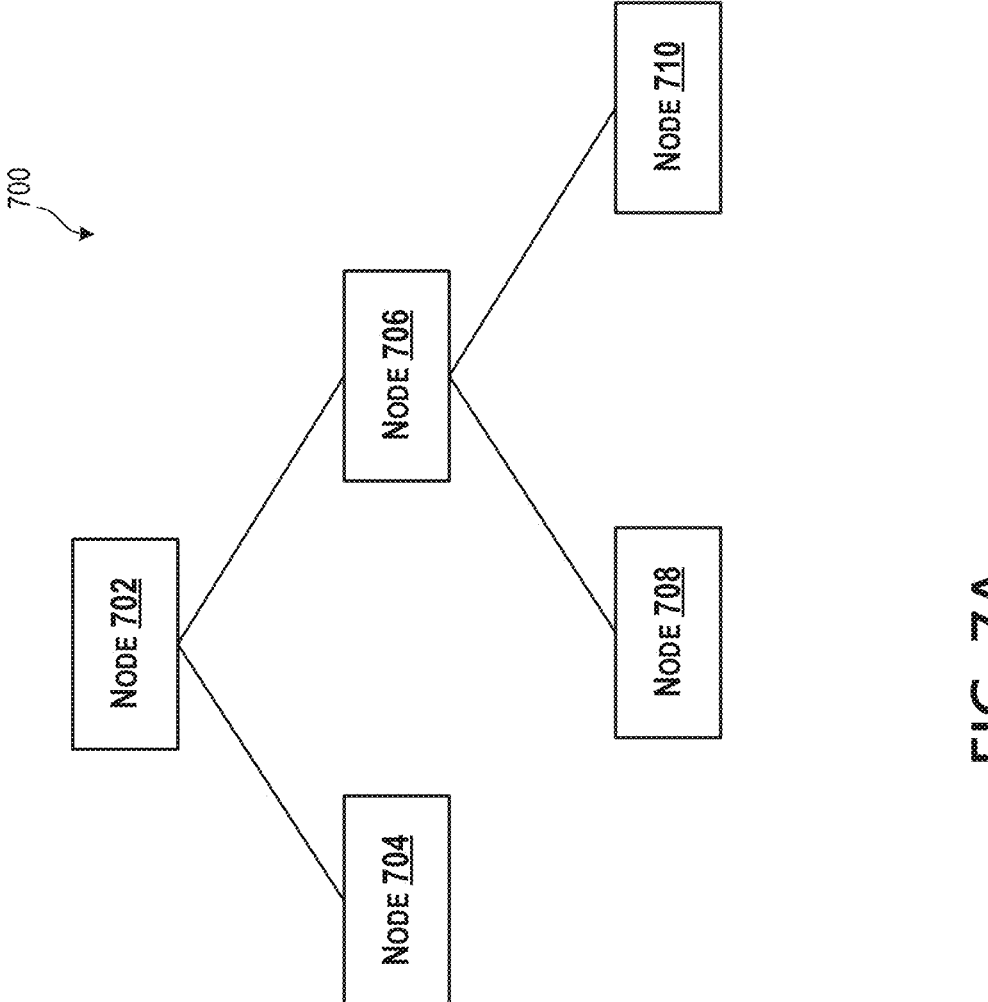
FIGS. 7A, 7B, and 7C collectively depict example methods for distributing various portions of task data represented in a tree data structure.

In some embodiments, the data to be processed for a task may be represented in a tree data structure. FIG. 7A illustrates an example tree data structure 700 that may comprise a data node 702, data nodes 704 and 706 that are children of the data node 702, and data nodes 708 and 710 that are children of the data node 706. The data nodes 702, 704, 706, 708, and 710 may represent different objects. For example, the tree data structure 700 may represent a genealogy tree where the data node 702 comprises data for a grandfather for a person, the data node 704 comprises data for a paternal aunt, the data node 706 comprises data for the father, the data node 708 comprises data for a brother, and the data node 710 comprises data for the person. The code for an existing computing task designed to process the data of the genealogy tree linearly may iterate through the tree data structure 700 to identify all the nodes 702, 704, 706, 708, and 710 and process data for each node one by one. However, the system and method described herein may process data of some or all of the nodes concurrently. The tree data structure in FIG. 7A is only an example used to illustrate the algorithms in FIGS. 7B and 7C, but any tree data structures may be processed by the algorithms in FIGS. 7B and 7C as long as the node may be processed independently of each other.

Figure 7B:
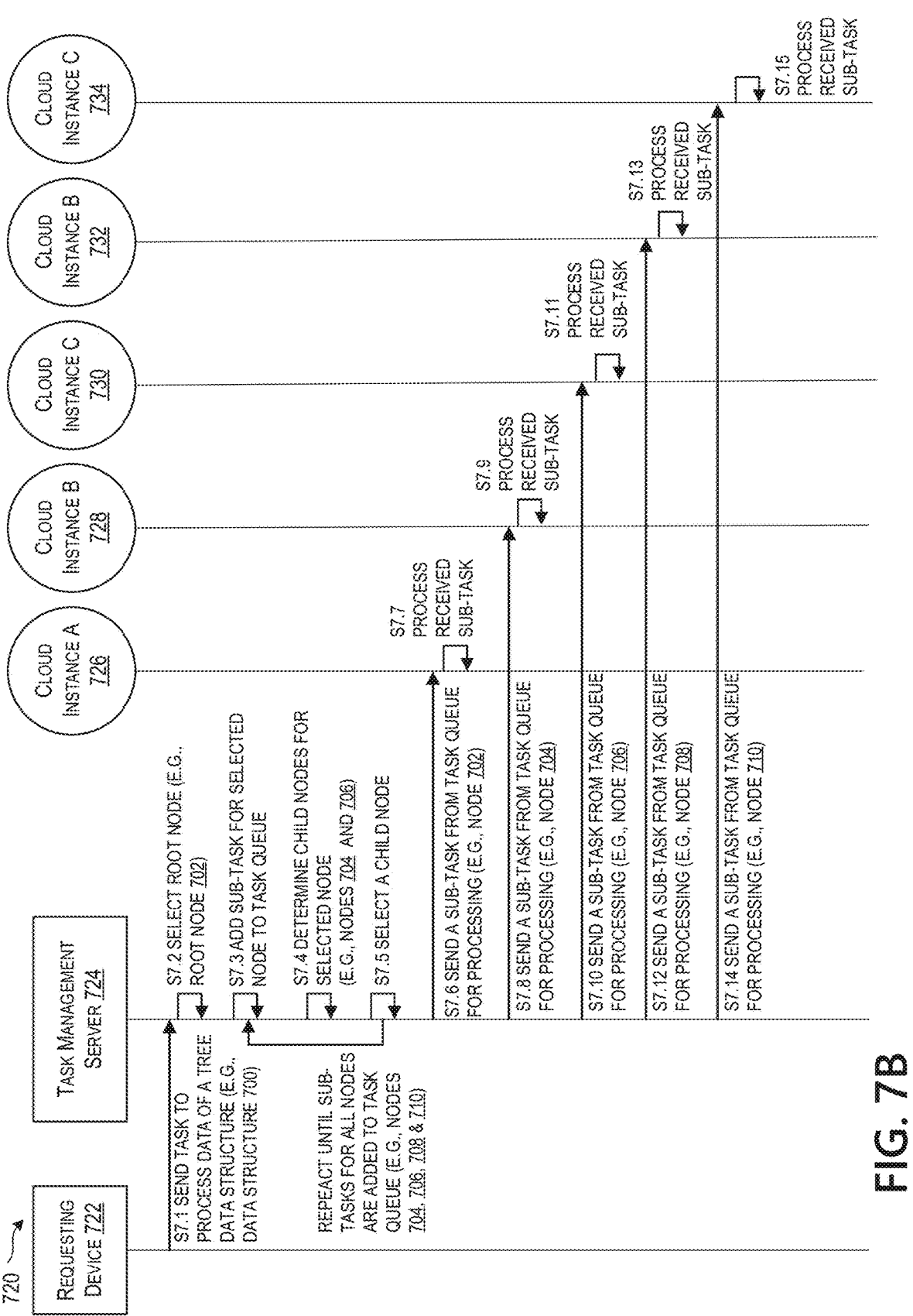

FIG. 7B is a sequence diagram illustrating an example workflow 720 for distributing various portions or sub-tasks of a task for processing data in a tree data structure. The actions in the workflow 720 may be performed in different orders and with different, fewer, or additional actions than those illustrated in FIG. 7B. Multiple actions can be combined in some implementations.

The workflow 710 begins at step S7.1 where a requesting device 722 (e.g., the task requesting devices 304A-C in FIG. 3, the client devices 107, 109 in FIG. 1, the client devices 211-214 in FIG. 2, a cloud operator, or a cloud customer) may send a request to execute a task to a task management server 724 (e.g., the task management server 302 in FIG. 3, the cloud management server 210 in FIG. 2, etc.). The task may be programmed or designed to execute linearly, and the data to be processed during the execution of the task may be represented by a tree data structure (e.g., the tree data structure 700).

At the step S7.2, the task management server 724 may determine data from the root node of the tree data structure. For example, the task management server 724 may determine the root node 702 from the tree data structure 700. At step S7.3, the task management server 724 may add a sub-task for the identified node (e.g., the root node 702) to the task queue. At step S7.4, the task management server 724 may determine one child node of the selected root node (e.g., the child nodes 704 and 706). At step S7.5, the task management server 724 may select one of the child nodes and then add a sub-task for the selected node. Steps S7.3-7.5 are repeated until sub-tasks for all the data nodes (e.g., data nodes 704, 706, 708, and 710) are added to the task queue.

The task management server 724 may then assign sub-tasks from the task queue to multiple cloud instances such that the assigned sub-tasks for the data nodes in the tree data structure may be executed concurrently by the cloud instances. For example, the task management server 724 may assign the sub-task for data node 702 to the cloud instance A 726 at step S7.6, the sub-task for data node 704 to the cloud instance B 728 at step S7.8, the sub-task for the data node 706 to the cloud instance C 730 at step S7.10, the sub-task for the data node 708 to the cloud instance D 732 at step S7.12, and the sub-task for the data node 710 to the cloud instance E 734 at step S7.14. The cloud instance A 726 at step S7.7, the cloud instance B 728 at step S7.9, the cloud instance C 730 at step S7.11, the cloud instance D 732 at step S7.13, and the cloud instance E 734 at S7.15 may initiate concurrent performance of their assigned tasks. The task management server 724 may not assign the sub-tasks all at the same time. The assignments may depend on the availability of cloud instances to perform the sub-tasks. After receiving indications that all the sub-tasks for the data nodes in the tree data structure have been completed, the task management server 724 may gather the results from all the cloud instances and send a report to the task requesting device 722 or send results from the performances of the sub-tasks to the task requesting device 722.

Figure 7C:
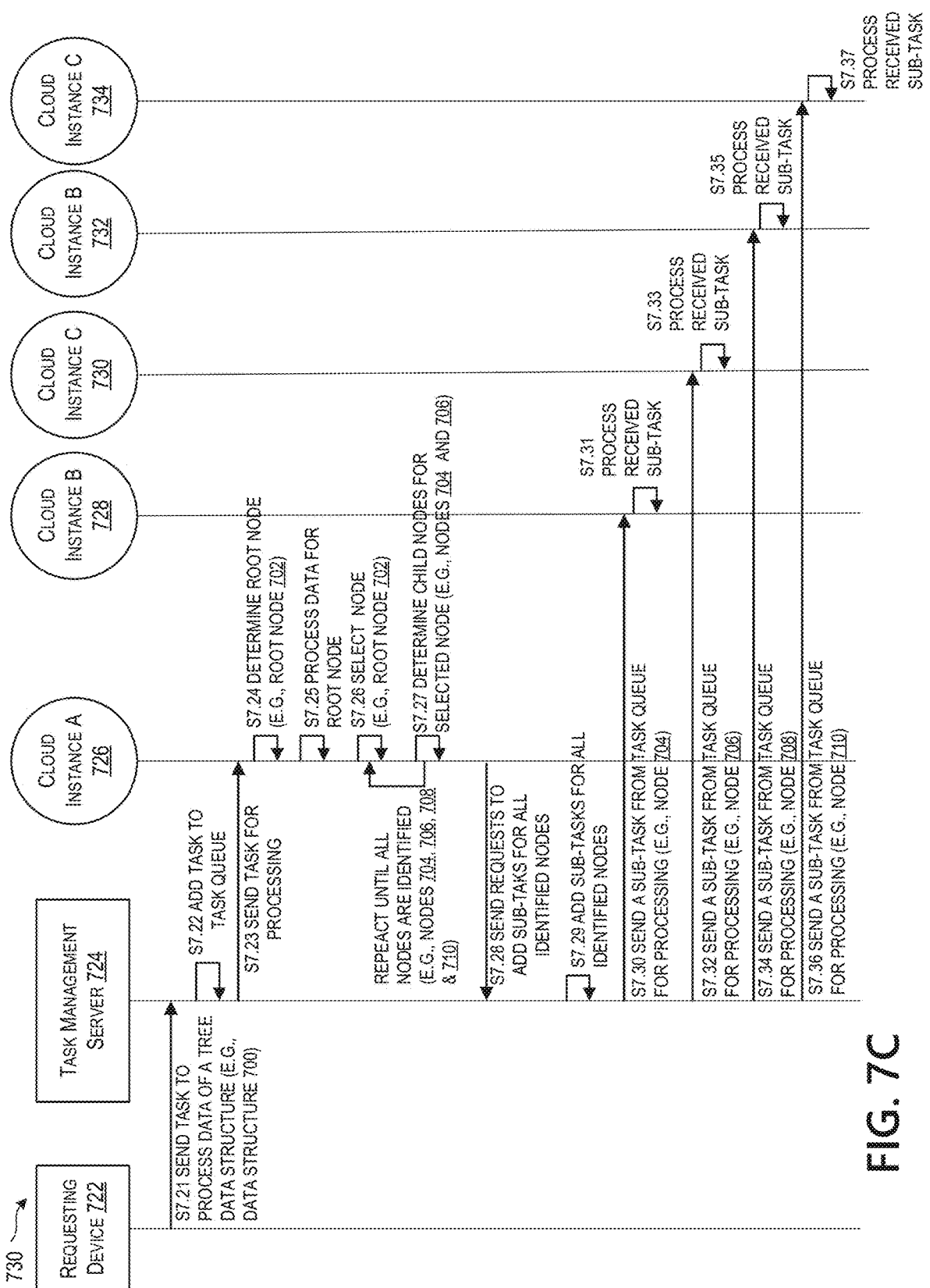

FIG. 7C illustrates an alternate workflow 730 for distributing various portions or sub-tasks of a task represented by a tree data structure. The actions in the workflow 730 may be performed in different orders and with different, fewer, or additional actions than those illustrated in FIG. 7C. Multiple actions can be combined in some implementations.

The workflow 730 begins at step S7.21, where the requesting device 722 may send a request to execute a task to the task management server 724. The task may be represented by a tree data structure (e.g., the tree data structure 700). At step S7.22, the task management server 724 may add the task to the task queue maintained by the task management server 724. At step S7.23, the task management server 724 may dispatch or assign the task to the cloud instance A 726 for processing. The task management server 724 may determine that the cloud instance A 726 is available and send the task to the cloud instance A 726. Alternatively, the cloud instance A 726 may request the task from the task management server 724. The task management may also create the cloud instance A 726 specifically for the execution of the task.

At step S7.24, the cloud instance A 726 may determine that the data to be processed is stored in a tree data structure and identify the root node of the tree data structure. For example, the cloud instance A 726 may determine the data node 702 from the tree data structure 700. At step S7.25, the cloud instance A 726 may initiate processing of the data of the root node. At step S7.26, the cloud instance A 726 may select the root node, and at step S7.27, the cloud instance A 726 may determine one or more child nodes of the selected root node (e.g., the child nodes 704 and 706). Steps S7.26-7.27 may be repeated until all the data nodes (e.g., data nodes 704, 706, 708, and 710) are identified.

At step S7.28, the cloud instance A 726 may send a request to the task management server 724 to add sub-tasks for the identified data nodes (e.g., data nodes 704, 706, 708, and 710) to the task queue. At step S7.29, the task management server 724 may receive the request and add sub-tasks for the identified nodes to the task queue.

The task management server 724 may then assign sub-tasks from the task queues to multiple cloud instances such that the data processing of the child nodes may be executed concurrently with the data processing of the root node 702 by the cloud instance A 726. For example, the task management server 724 may assign the sub-task for data node 704 to the cloud instance B 728 at step S7.30, the sub-task for the data node 706 to the cloud instance C 730 at step S7.32, the sub-task for the data node 708 to the cloud instance D 732 at step S7.34, and the sub-task for the data node 710 to the cloud instance E 734 at step S7.36. The cloud instance A 726 at step S7.25, the cloud instance B 728 at step S7.31, the cloud instance C 730 at step S7.33, the cloud instance D 732 at step S7.35, and the cloud instance E 734 at S7.37 may concurrently perform their assigned tasks. After receiving indications that all the sub-tasks for the data nodes in the tree data structure have been completed, the task management server 724 may gather the results from all the cloud instances and send a report to the task requesting device 722.

Figure 8A:
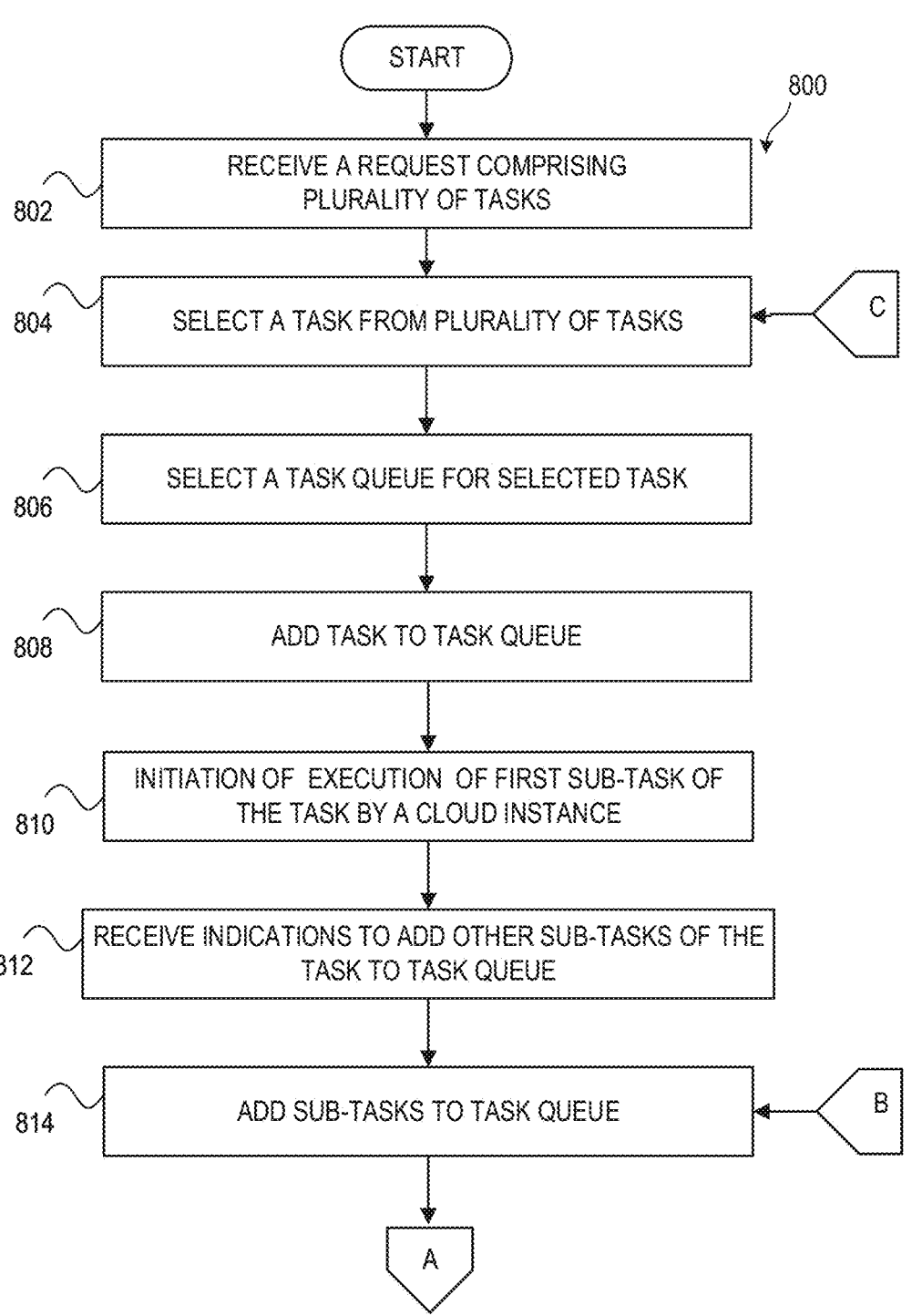
FIGS. 8A and 8B collectively illustrate an example algorithm for a task management system for distributing various portions of a task to cloud instances.
Figure 8B:
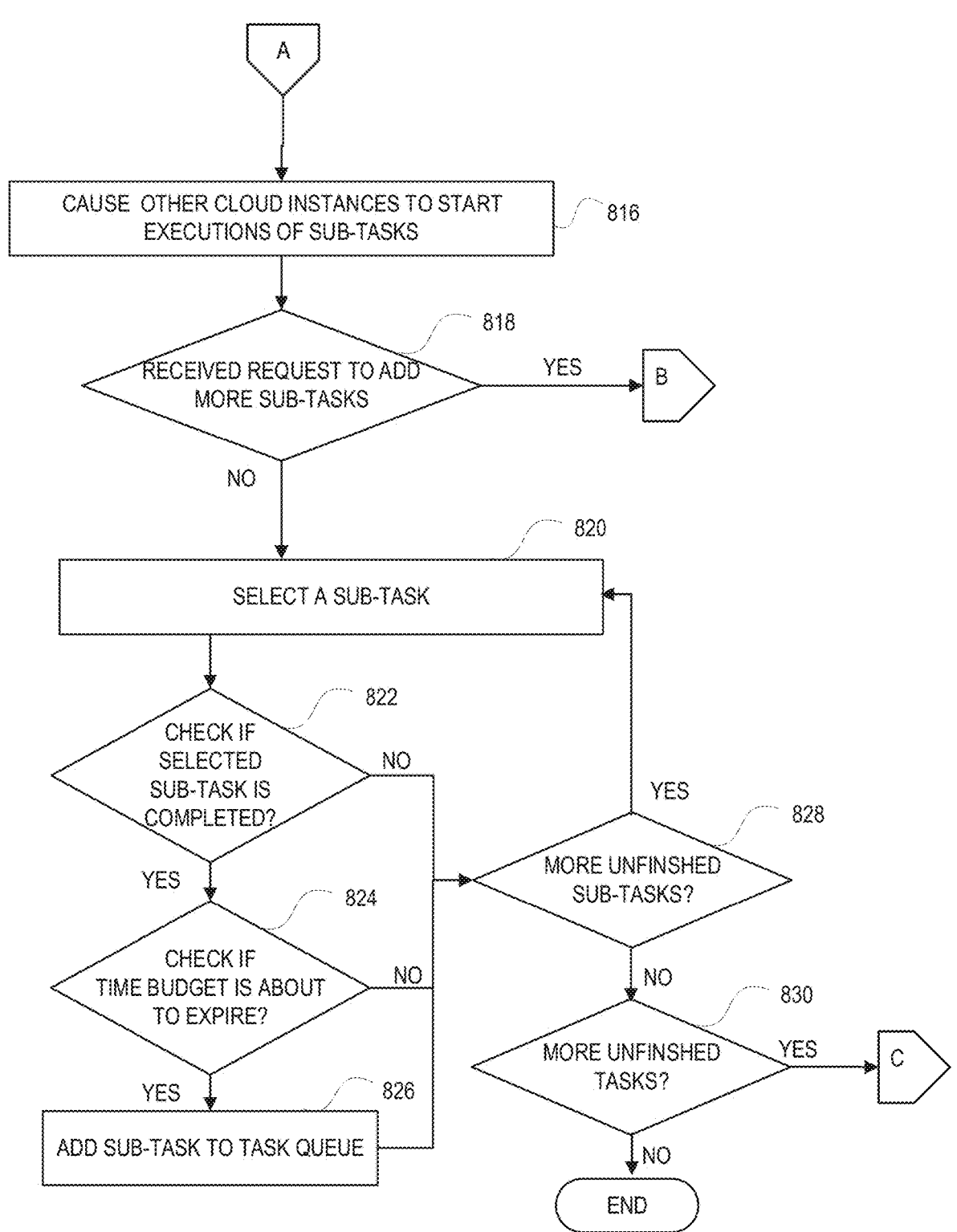

FIGS. 8A and 8B collectively illustrate an example algorithm 800 for a task management system (e.g., the task management server 302 in FIG. 3, the cloud management server 210 in FIG. 2, etc.) for distributing various portions of a task or sub-tasks to cloud instances for execution. At step 802 of FIG. 8A, a request for executing a plurality of tasks may be received. Some or all of the tasks in the plurality of tasks may depend on completing other tasks. Alternately, all the tasks in the plurality of tasks may be performed independently of each other. Based on the dependencies of the tasks, a task may be selected from the plurality of tasks at step 804.

A plurality of task queues may be maintained (e.g., the task queues 412, 414, 416 in FIG. 4B), where each task queue may be configured for a particular type of task. The selected task may be added to a task queue that stores tasks of the task type of the selected task. Therefore, at step 806, a task queue may be selected for the selected task based on the type of task requested, and the selected task may be added to the selected task queue at step 808. Alternatively, the selected task may be added to a task queue that stores all types of tasks (e.g., the task queue 402 in FIG. 4A).

At step 810, the execution of a first sub-task/portion of the selected task may be initiated by a cloud instance. Data associated with the task may be sent to the cloud instance. The cloud instance may determine the first sub-task/portion of the task based on the data that would be processed during the execution of the task or the task code to be executed. The task management system may determine the first sub-task/portion in some embodiments and then send the data associated with the first sub-task/portion to the cloud instance. In some examples, the first sub-task/portion may be determined based on a token received with the task data (e.g., determine a first portion of the task by the first cloud instance 506 based on a null or a non-alphanumeric character in FIG. 5). In some examples, the data to be processed for the task may be represented in a multi-tiered data structure, and execution of the first sub-task/portion may comprise processing data of a first tier of the multi-tiered data structure (e.g., processing of data in the first tier 602 of the multi-tiered data structure 600 in FIGS. 6A and 6B). In other examples, the data to be processed for the task may be represented in a tree data structure, and the execution of the first sub-task/portion may comprise processing data of a root data node of the tree data structure (e.g., processing of data of root node 702 of the tree data structure 700 in FIGS. 7A and 7B). The cloud instance may send an indication to the task management system that the cloud instance is performing the first sub-task/portion.

At step 812, indications may be received to add tasks for performing other sub-tasks/portions to the task queue. The cloud instance of step 810 may determine the other tasks/portions, and the task management system may receive the indications from the cloud instance. Alternatively, the task management system may determine the tasks/portions that need to be executed and send signals to add the determined tasks/portions to the task queue. In some examples, the other tasks/portions may be determined based on an updated token received after initiation of the execution of the first portion/sub-task by the cloud instance of step 810 (e.g., determine a second portion and a third portion of the task based on an alphanumeric character such as "1" and "2" in FIG. 5). In some examples, the data to be processed for the task may be represented in a multi-tiered data structure, and the other tasks/portions may comprise data of tiers other than the first tier of the multi-tiered data structure (e.g., data in the second tier 604 and the third tier 606 of the multi-tiered data structure 600 in FIGS. 6A and 6B). In other examples, the data to be processed for the task may be represented in a tree data structure, the other tasks/portions may comprise data of the child nodes of the root node in the tree data structure (e.g., data of child nodes 704, 706, 708, and 710 of the tree data structure 700 in FIGS. 7A and 7B).

The tasks for performing other portions or other sub-tasks are added to the task queue at step 814. In some examples, the other tasks/portions may be added to the task queue selected at step 806. In other examples, the tasks/portions may be added to other task queues based on the type of task requested in the other tasks/portions.

At step 816 of FIG. 8B, the execution of one or more other tasks/portions may be initiated by cloud instances other than the cloud instance of step 810. Data associated with the other tasks/portions may be sent to the other cloud instances, or the other cloud instances may request to execute the other tasks/portions to the task management system. In some examples, an alphanumeric token received at step 812 may be sent to the other cloud instances such that the other cloud instances may initiate the execution of the other tasks/portions based on the alphanumeric token. In some examples, the execution of the other portions/sub-tasks may comprise processing data in tiers other than the first tier of the multi-tiered data structure (e.g., processing of data in the second and third tier of the multi-tiered data structure 600 in FIGS. 6A and 6B). In other examples, the data to be processed for the task may be represented in a tree data structure, and the execution of the other tasks/portions may comprise processing data of child nodes of a root node in the tree data structure (e.g., processing of data of child nodes 704, 706, 708, and 710 of the tree data structure 700 in FIGS. 7A and 7B). The other cloud instance may send indications to the task management server that the cloud instances are performing the other tasks/portions of the task. Therefore, the cloud instance at step 810 and the other cloud instances of step 816 may concurrently execute various tasks/portions of the task selected at step 804.

At step 818, it may be determined whether requests to add more sub-tasks have been received from the cloud instance of step 810 or the other cloud instances of step 816. If requests have been received to add more sub-tasks, the algorithm may proceed back to step 814 to add the requested sub-tasks to the task queue.

If it is determined that no more requests have been received at step 818, the algorithm may proceed to step 820, where one of the sub-task currently being executed is selected. At step 822, it is determined whether the selected sub-task is completed. If the selected sub-task is completed, the algorithm may proceed to step 828. If the selected sub-task is not completed, it is determined at step 824 whether a time budget associated with the sub-task or the original task at step 804 is about to expire. If the time budget is not about to expire, the algorithm may proceed to step 828. If the time budget is about to expire, at step 826, a new task may be added to the task queue for completing the selected sub-task. Adding a new task to the task queue may ensure that the work performed for the sub-task is not lost when the time budget expires. In some examples, the state of the selected sub-task may be saved when the sub-task is added back to the task queue. When the sub-task is again executed later by another cloud instance, that cloud instance may restore the execution of the sub-task from the saved state of the sub-task.

Then the algorithm may proceed to step 828, where it is determined whether there are any more unfinished sub-tasks. If there are more unfinished sub-tasks, the algorithm may proceed to step 820 such that time budgets for other unfinished sub-tasks are evaluated to determine whether the time budgets will expire soon. If all the sub-tasks are completed, the algorithm may proceed to step 830 to determine whether there any more unfinished tasks from the plurality of tasks received at step 802. If there are more unfinished tasks, the algorithm may proceed to step 804 to select the next task. Finally, the algorithm ends if all the tasks from the plurality of tasks received at step 802 have been completed.

Figure 9:
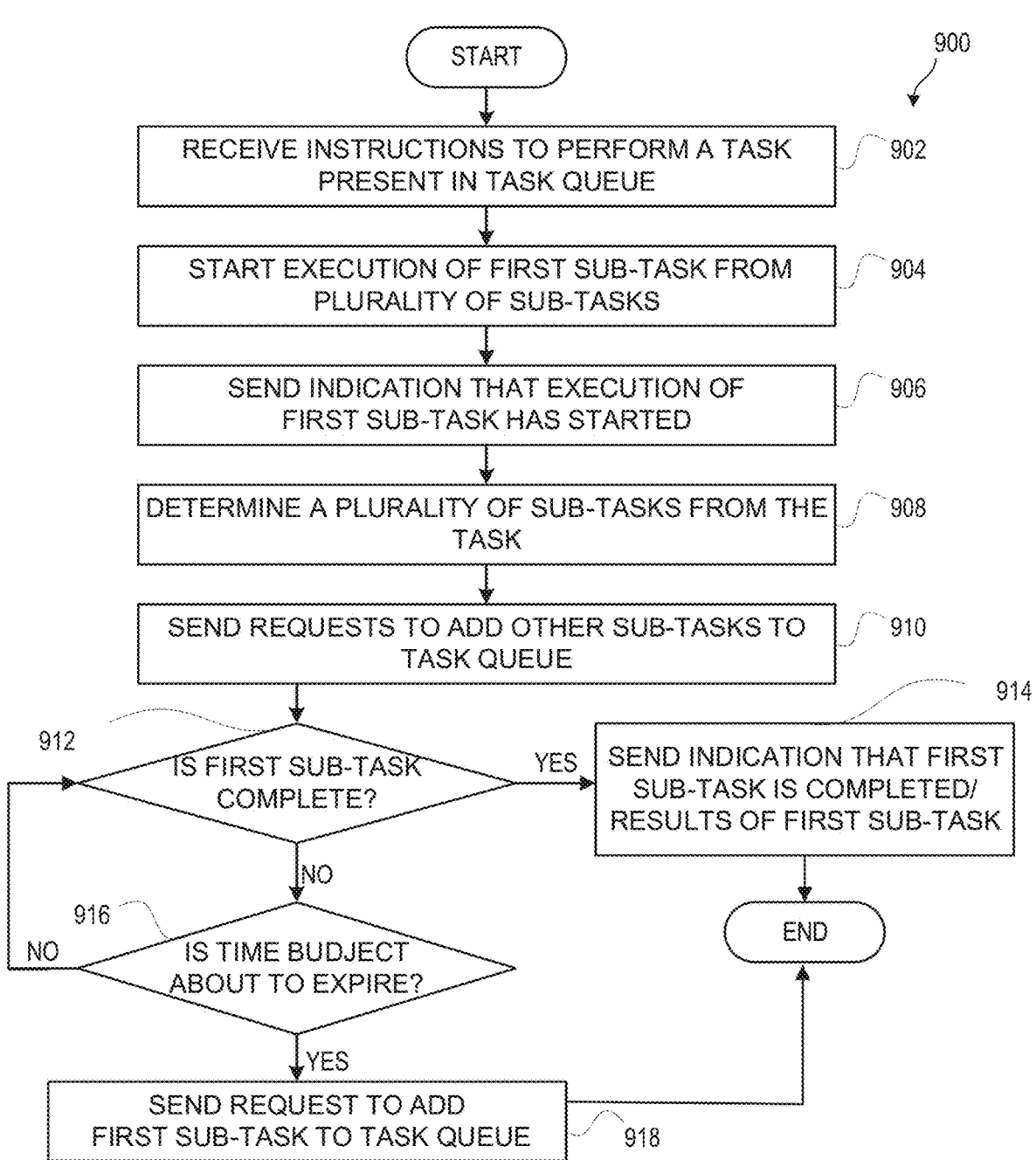
FIG. 9 is a flowchart showing an example algorithm for a cloud instance for executing a portion of a task.

FIG. 9 is a flowchart showing an example algorithm 900 for a cloud instance (e.g., the cloud instances 306A-B and the cloud instances 308A-C in FIG. 3) for executing a sub-task/portion of a task. At step 902 of FIG. 9, a request for executing a task from a task queue may be received by the cloud instance. At step 904, the cloud instance may initiate the execution of a first sub-task/portion of the task. Data associated with the task may be sent to the cloud instance, and the cloud instance may determine the first sub-task/portion of the task based on the data that would be processed during the execution of the task or the task code to be executed. In some examples, the first sub-task/portion may be determined based on a token received with the task data (e.g., determine a first portion of the task by the first cloud instance 506 based on a null or a non-alphanumeric character in FIG. 5). In some examples, the data to be processed for the task may be represented in a multi-tiered data structure, and data for the first sub-task/portion may comprise data from a first tier of the multi-tiered data structure (e.g., processing of data in the first tier 602 of the multi-tiered data structure 600 in FIGS. 6A and 6B). In other examples, the data to be processed for the task may be represented in a tree data structure, and execution of the first portion/sub-task may comprise processing data of a root data node of the tree data structure (e.g., processing of data of root node 702 of the tree data structure 700 in FIGS. 7A and 7B). At step 906, the cloud instance may send an indication that the cloud instance is performing the first portion/sub-task.

At step 908, the cloud instance may determine other sub-tasks/portions of the task that other cloud instances may execute. In some examples, the other sub-tasks/portions may be determined based on updating a token received with the task (e.g., determine the next portion of the task to be executed based on an alphanumeric character such as "1" and "2" in FIG. 5). In some examples, the other sub-tasks/portions may comprise data of tiers other than the first tier of the multi-tiered data structure (e.g., data in the second tier 604 and the third tier 606 of the multi-tiered data structure 600 in FIGS. 6A and 6B). In other examples, the other sub-tasks/portions may comprise data of the child nodes of the root node in the tree data structure (e.g., data of child nodes 704, 706, 708, and 710 of the tree data structure 700 in FIGS. 7A and 7B). At step 910, the cloud instance may send a request to the task management system to add tasks for performing sub-tasks/portions to the task queue.

At step 912, it is determined whether the cloud instance has completed the execution of the first sub-task/portion. If it is determined that the first sub-task is completed, at step 914, the cloud instance may send an indication to the task management system that the first sub-task/portion is completed and/or the results of the execution of the first sub-task/portion. If at step 912, it is determined that the first sub-task is not completed, it is determined at step 916 whether a time budget associated with the first sub-task or the original task at step 902 is about to expire. If the time budget is not about to expire, the algorithm may proceed back to step 912. If the time budget is about to expire, at step 918, the cloud instance may send a request to the task management system to add a new task to the task queue for completing the first sub-task/portion. Adding a new task to the task queue may ensure that the work performed for the first sub-task/portion is not lost when the time budget for the first sub-task or task expires. In some examples, the execution of the first sub-task/portion may be halted, and the state of the first sub-task/portion may be saved when the request to add the first sub-task/portion to the task queue is sent to the task management system. When the first sub-task/portion is again executed later by another cloud instance, that cloud instance may restore the execution of the first sub-task/portion from the saved state of the first sub-task/portion.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:

receiving, by a task management server, a first request to perform a task;

adding, by the task management server, the first request to a task queue, wherein the adding comprises:

initializing a first type of token corresponding to the first request, wherein the first type of token comprises a null character;

adding the first type of token to the task queue with the first request;

causing, by the task management server and based on the adding of the first request to the task queue and the adding of the first type of token to the task queue with the first request, a first cloud instance, of a plurality of cloud instances, to initiate performing of the task, wherein initiating performance on the first cloud instance comprises:

assigning the task and the first type of token to the first cloud instance based on availability of the first cloud instance;

creating the first cloud instance specifically for execution of the task;

requesting, by the first cloud instance, the task and the first type of token from the task management server;

receiving, by the task management server and from the first cloud instance:

an indication that the first cloud instance is performing a first portion of the task; and a second request for performing a remaining portion of the task;

adding, to the task queue, the second request, where in the adding comprises:

initializing a second type of token corresponding to the second request, wherein the second type of token comprises a non-zero numeric character;

adding the second type of token to the task queue with the second request; and causing, by the task management server and based on the adding of the second request to the task queue and the adding of the second type of token to the task queue with the second request, a second cloud instance, of the plurality of cloud instances, to initiate performing of the remaining portion of the task concurrently with the performing of the first portion of the task; and receiving, by the task management server, from the first cloud instance and based on an expiration period associated with the performing of the task or the performing of the first portion of the task, to add, to the task queue, a third request for completing the performing of the first portion of the task wherein causing the first cloud instance to initiate performing of the task comprises sending the first type of token to the first cloud instance, wherein the first type of token is determined based on the first request, wherein receiving the second request comprises receiving, from the first cloud instance, the second type of token, wherein the second type of token is determined based on the performing of the first portion of the task, wherein the causing the second cloud instance to initiate performing of the remaining portion of the task comprises sending the second type of token to the second cloud instance;

wherein the first request comprises data associated with the task and the data is represented in a tiered data structure comprising at least a first tier and a second tier; wherein the indication that the first cloud instance is performing the first portion of the task comprises an indication that the first cloud instance is processing data of the first tier; and wherein the second request comprises a request to process data of the second tier.

2. The method of claim 1, wherein processing of data associated with the first portion of the task is independent of processing of data associated with the remaining portion of the task.

3. The method of claim 1, wherein the causing the first cloud instance to initiate performing of the task comprises receiving, from the first cloud instance, an indication of a selection, by the first cloud instance, of the first request from the task queue; and wherein the causing the second cloud instance to initiate performing of the remaining portion of the task comprises receiving, from the second cloud instance, an indication of a selection, by the second cloud instance, of the second request from the task queue.

4. The method of claim 1, further comprising:

determining, based on receiving a third type of token from a third cloud instance of the plurality of cloud instances, that all portions of the task have been assigned for execution, wherein the third type of token is a null character.

5. The method of claim 1, wherein the first request comprises data associated with the task and the data is represented in a tree data structure comprising at least a root node and one or more child nodes associated with the root node;

wherein the indication that the first cloud instance is performing the first portion of the task comprises an indication that the first cloud instance is processing data associated with the root node; and wherein the second request comprises a request to, concurrently with the root node, process data associated with the one or more child nodes.

6. The method of claim 1, wherein receiving the first request comprises receiving data associated with a plurality of tasks comprising the task;

wherein completion of the performing of the task is a prerequisite to the performing of a second task of the plurality of tasks; and the method further comprises:

selecting, based on the task, the task queue;

selecting, based on a determining that the performing of the task has been completed and for the second task, a second task queue; and adding, to the second task queue, a fourth request for performing the second task.

7. A method based on a plurality of cloud instances, comprising:

adding, by a task management server and to a task queue, a task wherein the adding comprises:

initializing a first type of token corresponding to a first request, wherein the first type of token comprises a null character;

adding the first type of token to the task queue with the first request;

sending, by the task management server, a first message to a first cloud instance, of a plurality of cloud instances, to initiate performing of the task;

receiving, by the task management server and from the first cloud instance, a request to add one or more sub-tasks, of the task, to the task queue;

adding, to the task queue, the one or more sub-tasks wherein the adding comprises:

initializing a second type of token corresponding to a second request, wherein the second type of token comprises a non-zero numeric character;

adding the second type of token to the task queue with the second request; and sending, by the task management server, a second cloud instance of the plurality of cloud instances, a second message to initiate performing of the one or more sub-tasks concurrently with performing of another sub-task of the task by the first cloud instance;

receiving, by the task management server, from the first cloud instance and based on an expiration period associated with the performing of the task or the performing of the one or more sub-tasks, to add, to the task queue, a third request for completing the performing of the one or more sub-task wherein sending the first message further comprises sending the first type of token to the first cloud instance, wherein the first type of token is determined based on the adding of the task to the task queue, wherein receiving the request comprises receiving, from the first cloud instance, the second type of token, wherein the second type of token is determined based on the performing of the another sub-task by the first cloud instance, wherein sending the second message further comprises sending the second type of token to the second cloud instance;

wherein the first request comprises data associated with the task and the data is represented in a tiered data structure comprising at least a first tier and a second tier; wherein the indication that the first cloud instance is performing the one or more sub-tasks, of the task, comprises an indication that the first cloud instance is processing data of the first tier; and wherein the second request comprises a request to process data of the second tier.

8. The method of claim 7, wherein processing of data associated with the one or more sub-tasks is independent of processing of data associated with the another sub-task.

9. The method of claim 7, wherein data associated with the task is represented in a tree data structure comprising at least:

a root node comprising data for the another sub-task; and one or more child nodes associated with the root node and comprising data for the one or more sub-tasks.

10. A method comprising:

receiving, by a task management server, a first request to perform a plurality of tasks;

initializing a plurality of task queues for the plurality of tasks, wherein the initializing comprises:

selecting, a first task from the plurality of tasks;

adding, the selected first task to a task queue, wherein the adding comprises:

initializing a first type of token corresponding to a first sub-task of the first task, wherein the first type of token comprises a null character;

adding the first type of token to the task queue with the first sub-task;

causing, by the task management server and based on the adding of the first task to the task queue and the adding of the first type of token to the task queue with the first sub-task, a first cloud instance, of a plurality of cloud instances, to initiate performing of a first sub-task of the selected first task, wherein initiating performance on the first cloud instance comprises:

assigning the first sub-task and the first type of token to the first cloud instance based on availability of the first cloud instance;

creating the first cloud instance specifically for execution of the first sub-task;

requesting, by the first cloud instance, the first sub-task and the first type of token from the task management server;

receiving, by the task management server and from the first cloud instance:

an indication to add tasks for performing other sub-tasks to the task queue;

adding, to the task queue, a second sub-task of the first task, where in the adding comprises:

initializing a second type of token corresponding to the second sub-task, wherein the second type of token comprises a non-zero numeric character;

adding the second type of token to the task queue with the second sub-task; and causing, by the task management server and based on the adding of the second sub-task to the task queue and the adding of the second type of token to the task queue with the second sub-task, a second cloud instance, of the plurality of cloud instances, to initiate performing of the second sub-task concurrently with the performing of the first sub-task; and receiving, by the task management server, from the first cloud instance and based on an expiration period associated with the performing of the task or the performing of the first sub-task, to add, to the task queue, a third request for completing the performing of the first sub-task wherein receiving the indication further comprises receiving the first type of token, wherein the first type of token is determined based on adding of the first sub-task to the task queue, wherein initiating the performing of the first sub-task further comprises determining, based on the performing of the first sub-task, the second type of token;

wherein the first request comprises data associated with the task and the data is represented in a tiered data structure comprising at least a first tier and a second tier; wherein the indication that the first cloud instance is performing the first sub-task, of the first task, comprises an indication that the first cloud instance is processing data of the first tier; and wherein the second request comprises a request to process data of the second tier.

11. The method of claim 10, wherein processing of data associated with the first sub-task is independent of processing of data associated with the second sub-task.

12. The method of claim 10, wherein data associated with the first task is represented in a tree data structure comprising at least:

a root node comprising data for the first sub-task; and one or more child nodes associated with the root node and comprising data for the second sub-task.

\* \* \* \* \*